(12) United States Patent
Kawashima et al.

(10) Patent No.: US 11,923,635 B2
(45) Date of Patent: Mar. 5, 2024

(54) PROTECTIVE COVER AND ON-VEHICLE DEVICE

(71) Applicant: DENSO CORPORATION, Kariya (JP)

(72) Inventors: Yasuhiro Kawashima, Kariya (JP); Taketo Harada, Kariya (JP); Keisuke Ueda, Kariya (JP)

(73) Assignee: DENSO CORPORATION, Kariya (JP)

( * ) Notice: Subject to any disclaimer, the term of this patent is extended or adjusted under 35 U.S.C. 154(b) by 371 days.

(21) Appl. No.: 17/315,092

(22) Filed: May 7, 2021

(65) Prior Publication Data

US 2021/0265771 A1  Aug. 26, 2021

Related U.S. Application Data

(63) Continuation of application No. PCT/JP2019/041358, filed on Oct. 21, 2019.

(30) Foreign Application Priority Data

Nov. 9, 2018  (JP) ................................ 2018-211640

(51) Int. Cl.
*H01R 13/52* (2006.01)
*B60R 19/48* (2006.01)
(Continued)

(52) U.S. Cl.
CPC ....... *H01R 13/5213* (2013.01); *B60R 19/483* (2013.01); *G01S 7/521* (2013.01);
(Continued)

(58) Field of Classification Search
CPC ............ H01R 13/5213; H01R 2201/20; H01R 2201/26; H01R 13/6591; H01R 13/5804;
(Continued)

(56) References Cited

U.S. PATENT DOCUMENTS 5,871,364 A * 2/1999 Shinchi ................ H01R 13/447
439/157
6,817,882 B1 * 11/2004 Bauer .................. H01R 13/641
439/911
(Continued)

FOREIGN PATENT DOCUMENTS

DE  102006008718 A1  8/2007
JP  58-71240 A  4/1983
(Continued)

*Primary Examiner* — Edwin A. Leon
(74) *Attorney, Agent, or Firm* — MASCHOFF BRENNAN

(57) ABSTRACT

A protective cover protects a connector coupling portion which is an electrical connection between an on-vehicle sensor to be mounted on a vehicle body component and a wiring. This protective cover includes a protection portion and a fixing portion. The protection portion covers the connector coupling portion at which a sensor-side connector which is provided on the on-vehicle sensor side and which extends in an extending direction is coupled to a wiring-side connector which is provided on the wiring side and which is to be coupled to the sensor-side connector while moving relatively with respect to the sensor-side connector in a coupling direction opposite to the extending direction. The fixing portion is integrally provided with the protection portion so as to be fixed on the on-vehicle sensor side.

13 Claims, 31 Drawing Sheets

(51) Int. Cl.
  *G01S 7/521* (2006.01)
  *G01S 15/931* (2020.01)
(52) U.S. Cl.
  CPC ....... *G01S 15/931* (2013.01); *G01S 2015/938* (2013.01); *H01R 2201/20* (2013.01); *H01R 2201/26* (2013.01)
(58) Field of Classification Search
  CPC . H01R 13/533; H01R 13/447; H01R 13/639; B60R 19/483; G01S 7/521; G01S 15/931; G01S 2015/938
  See application file for complete search history.

(56) References Cited

U.S. PATENT DOCUMENTS

| | | | |
|---|---|---|---|
| 9,887,482 B2 * | 2/2018 | Lam | ........................ H01R 24/62 |
| 2019/0391263 A1 | 12/2019 | Ueda et al. | |

FOREIGN PATENT DOCUMENTS

| | | | |
|---|---|---|---|
| JP | 2000-357422 A | 12/2000 | |
| JP | 2006-31988 A | 2/2006 | |
| JP | 2007-179931 A | 7/2007 | |
| JP | 2014-82089 A | 5/2014 | |
| JP | 2015-230201 A | 12/2015 | |
| JP | 2018-49796 A | 3/2018 | |
| WO | 2018164153 A1 | 9/2018 | |

* cited by examiner

PROTECTIVE COVER AND ON-VEHICLE DEVICE

CROSS REFERENCE TO RELATED APPLICATION

This application is the U.S. bypass application of International Application No. PCT/JP2019/041358 filed on Oct. 21, 2019, which designated the U.S. and claims priority to Japanese Patent Application No. 2018-211640, filed Nov. 9, 2018, the contents of which are incorporated herein by reference.

BACKGROUND

Technical Field

The present disclosure relates to a protective cover which protects an electrical connection between an on-vehicle sensor to be mounted on a vehicle body component and a wiring, and an on-vehicle device including the on-vehicle sensor and the protective cover.

Description of the Related Art

As an on-vehicle sensor, some of patent literatures disclose ultrasonic sensor systems. For example, an ultrasonic sensor system is mounted on a vehicle, and is electrically connected to a control unit via a wiring member. Such a ultrasonic sensor system has a chassis including a connector.

SUMMARY

The present disclosure provides a protective cover protecting a connector coupling portion which is an electrical connection between an on-vehicle sensor to be mounted on a vehicle body component and a wiring.

The protective cover includes a protection portion which covers the connector coupling portion at which a sensor-side connector which is provided on the on-vehicle sensor side and which extends in an extending direction is coupled to a wiring-side connector which is provided on the wiring side and which is to be coupled to the sensor-side connector while moving relatively with respect to the sensor-side connector in a coupling direction opposite to the extending direction, and a fixing portion integrally provided with the protection portion so as to be fixed on the on-vehicle sensor side.

Note that in some sections in application documents, reference numerals in brackets are assigned to respective elements. In this case, the reference numerals simply indicate an example of correspondence relationship between the elements and specific components in embodiments which will be described later. Thus, the present disclosure is not limited by the description of the reference numerals.

DETAILED DESCRIPTION OF THE PREFERRED EMBODIMENTS

As an on-vehicle sensor, for example, JP 2015-230201 A discloses an ultrasonic sensor system. The ultrasonic sensor system disclosed in the above patent literature is attached to a bumper and is electrically connected to a control unit via a wiring member such as a wire harness. Specifically, a chassis of the ultrasonic sensor system includes a connector portion. The connector portion has a predetermined shape which is connected to a terminal connection formed at a tip of the wiring member.

An on-vehicle sensor is mounted on a vehicle body component such as a bumper. Thus, the on-vehicle sensor is exposed to an environment where foreign material such as rainwater, snow, ice, mud and flying stones may impact or adhere. Environment resistance performance such as waterproof performance of the on-vehicle sensor can degrade due to adhesion of mud, water, snow or ice, collision of a flying stones, or the like. It is therefore necessary to prevent degradation of environment resistance performance at the on-vehicle sensor, particularly at a coupling portion between a connecter on the on-vehicle side and a connector on the wiring side.

Embodiments of the present disclosure will be described below on the basis of the drawings. Note that there is a possibility that understanding of the embodiment may be impaired if various kinds of modified examples which can be applied to one embodiment are inserted in the middle of a series of description of the embodiments. Thus, the modified examples will be described after description of the embodiments.

First Embodiment

Figure 1:
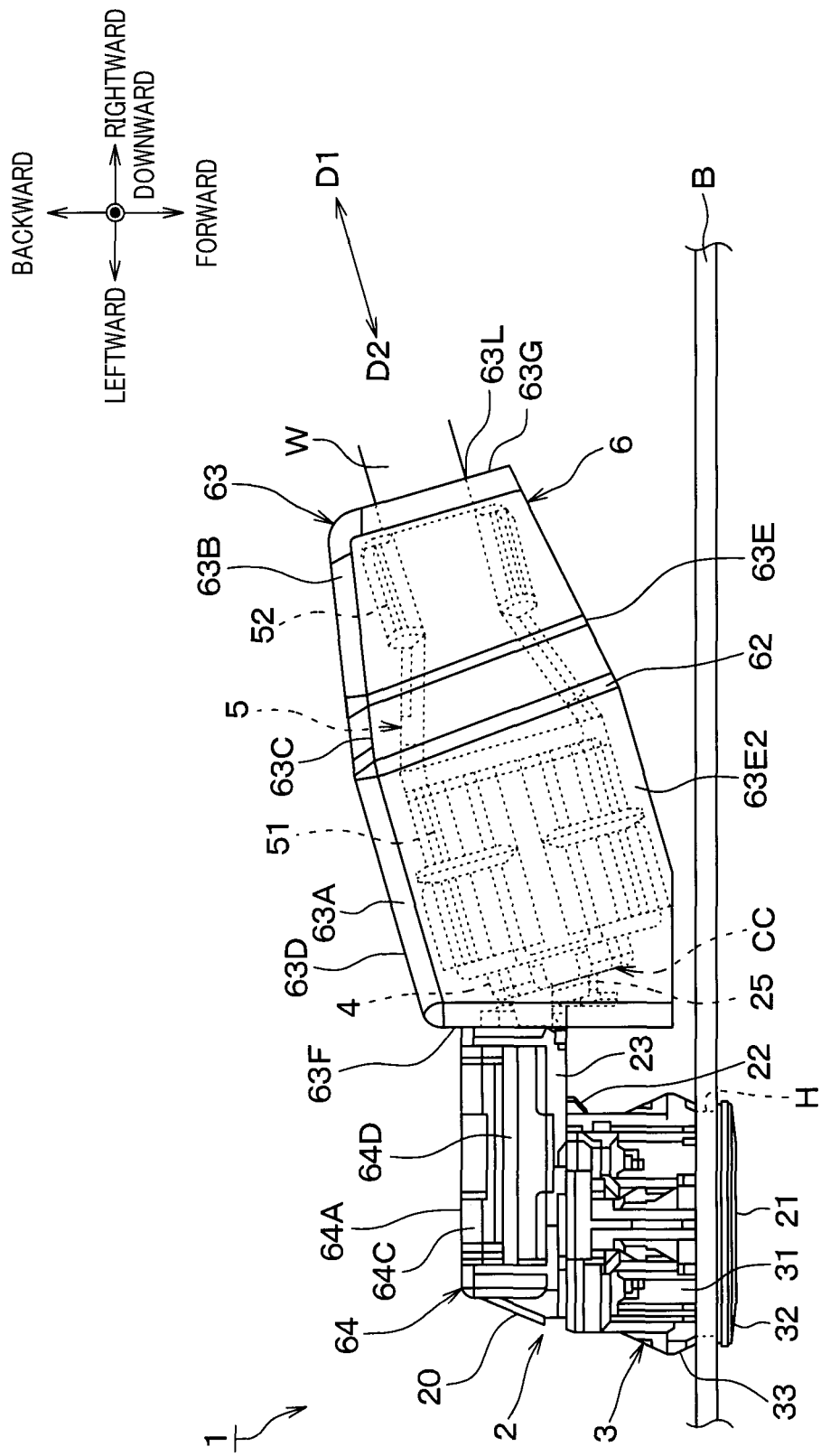
FIG. 1 is a bottom view illustrating a schematic configuration of an on-vehicle device according to a first embodiment in an on-vehicle state.
Figure 2:
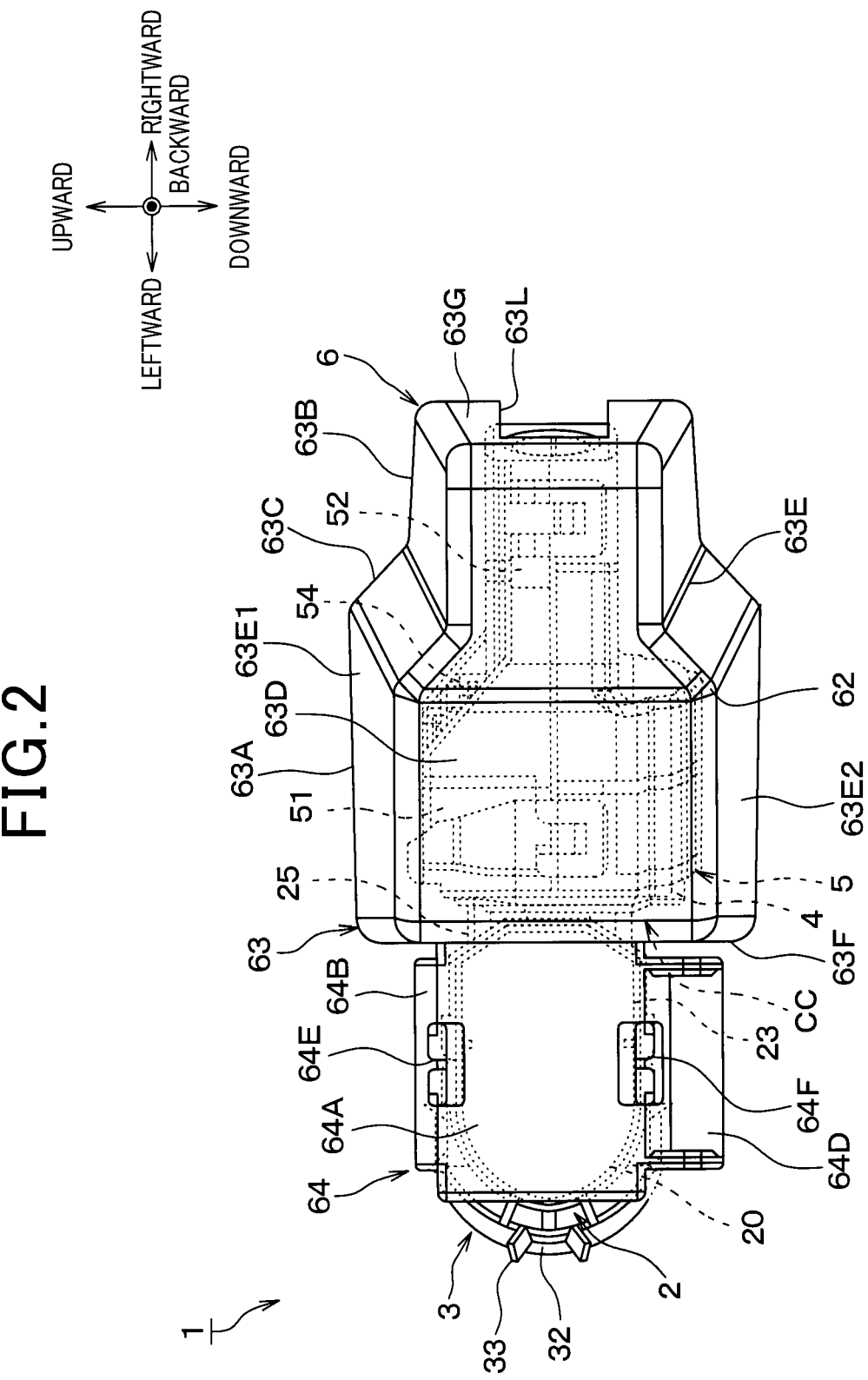
FIG. 2 is a rear view of the on-vehicle device illustrated in FIG. 1.
Figure 3:
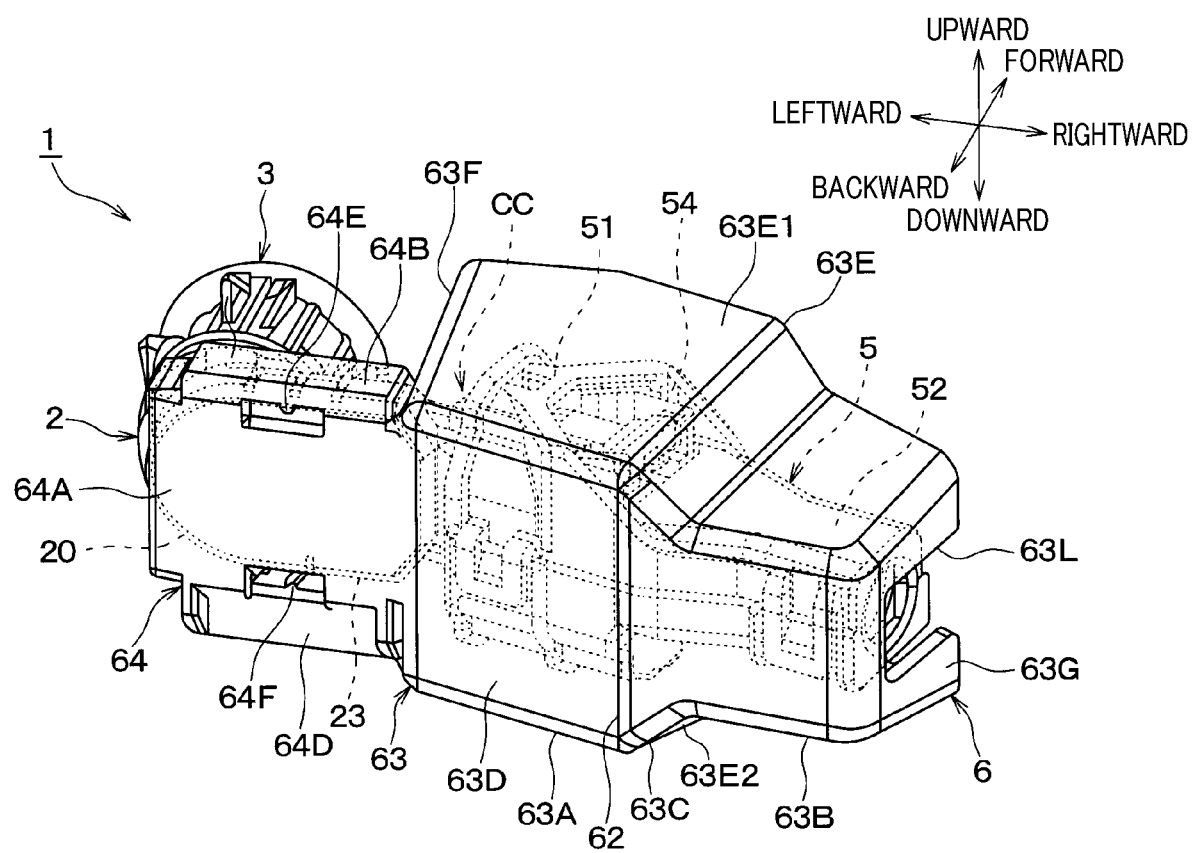
FIG. 3 is a perspective view of the on-vehicle device illustrated in FIG. 2.
Figure 4:
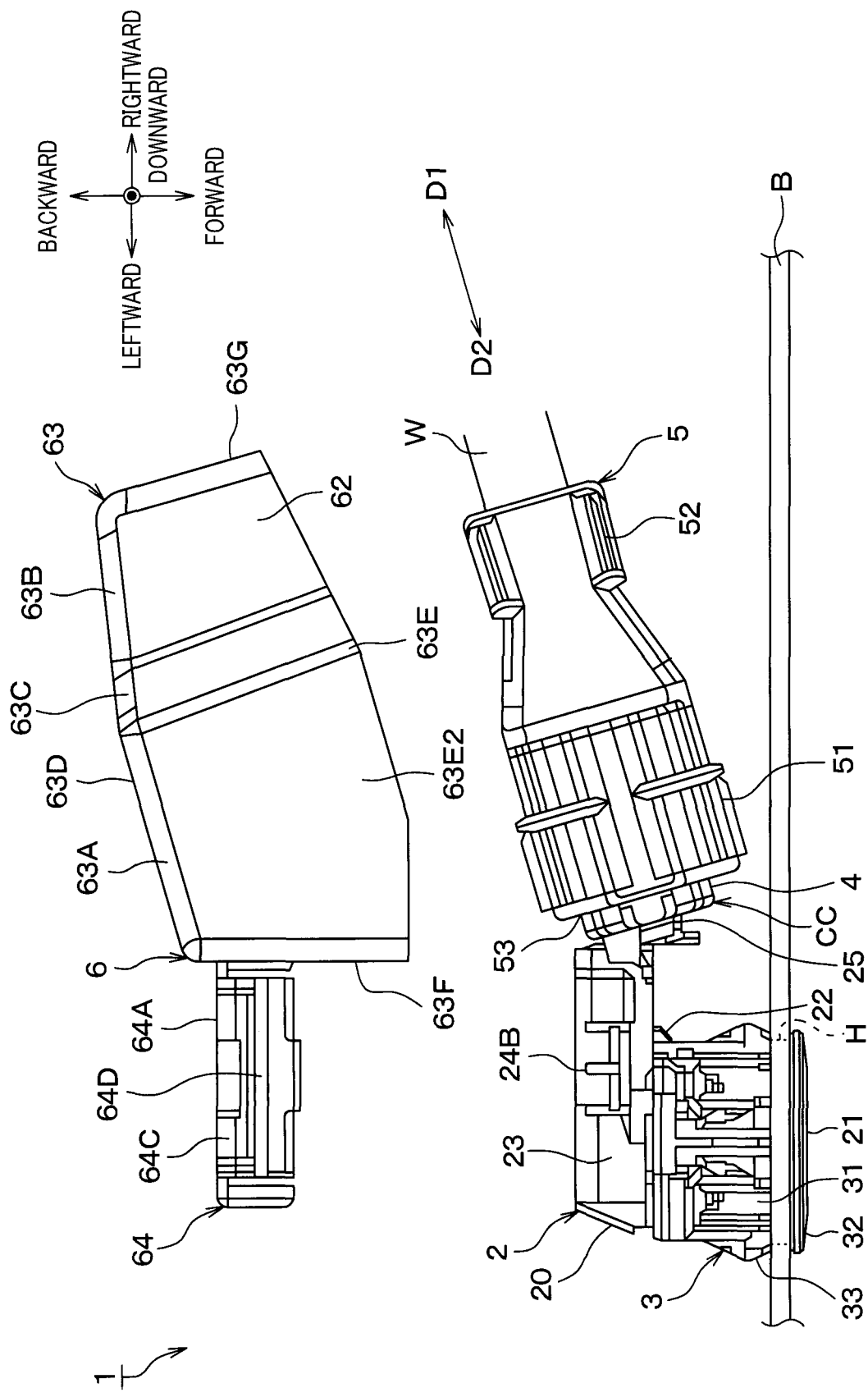
FIG. 4 is an exploded bottom view of the on-vehicle device illustrated in FIG. 1.
Figure 5:
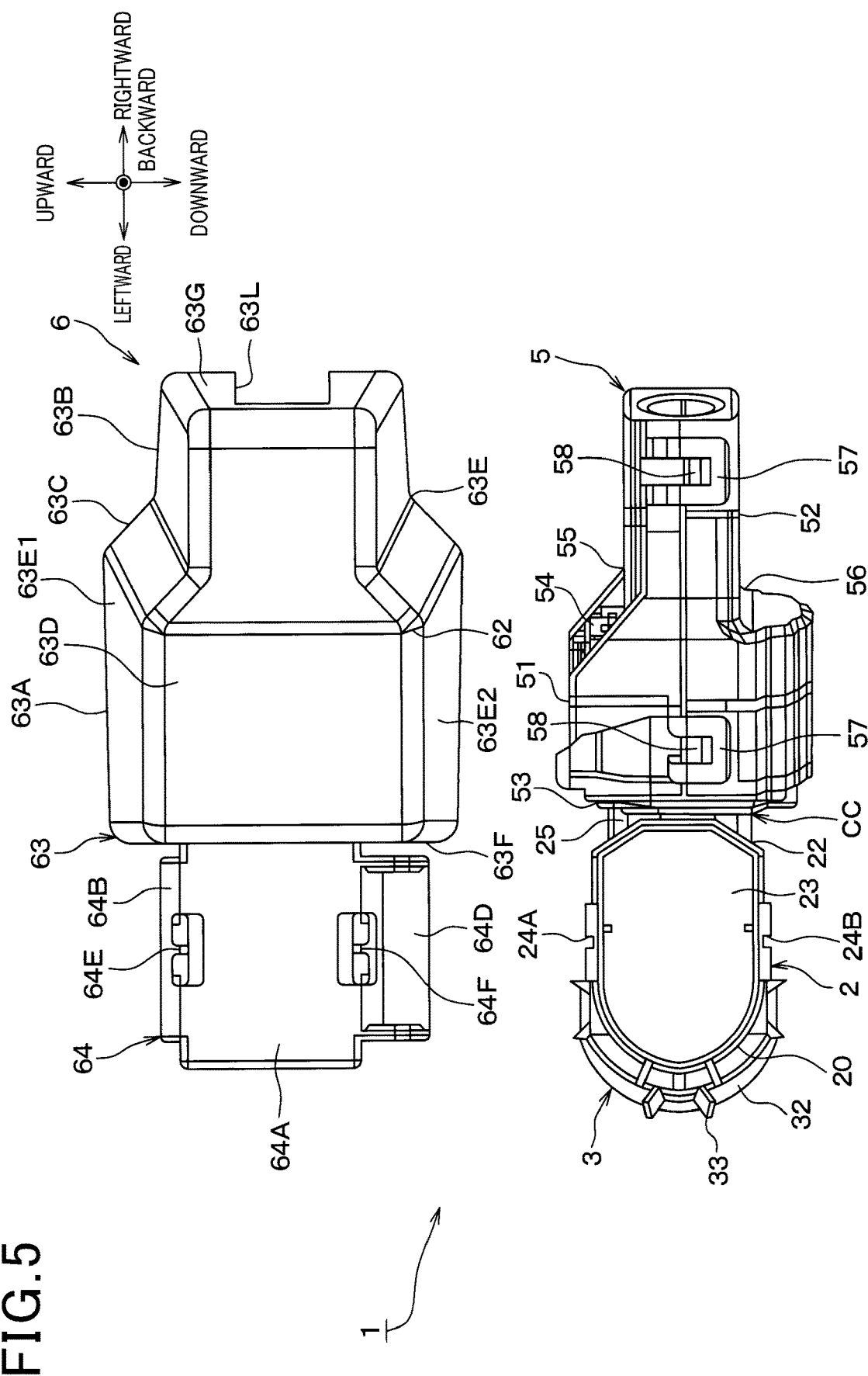
FIG. 5 is an exploded rear view of the on-vehicle device illustrated in FIG. 2.
Figure 6:
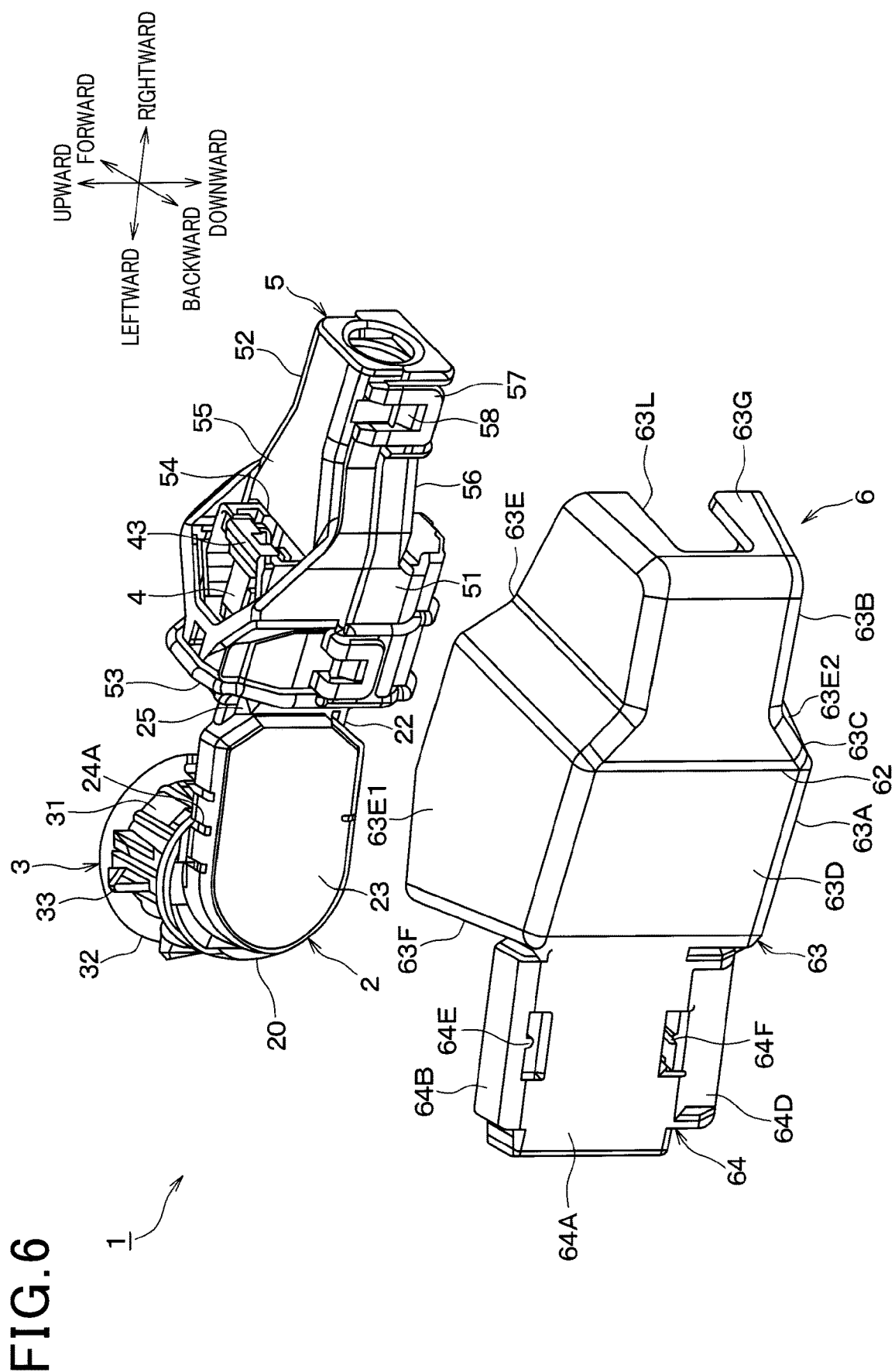
FIG. 6 is an exploded perspective view of the on-vehicle device illustrated in FIG. 3.
Figure 7:
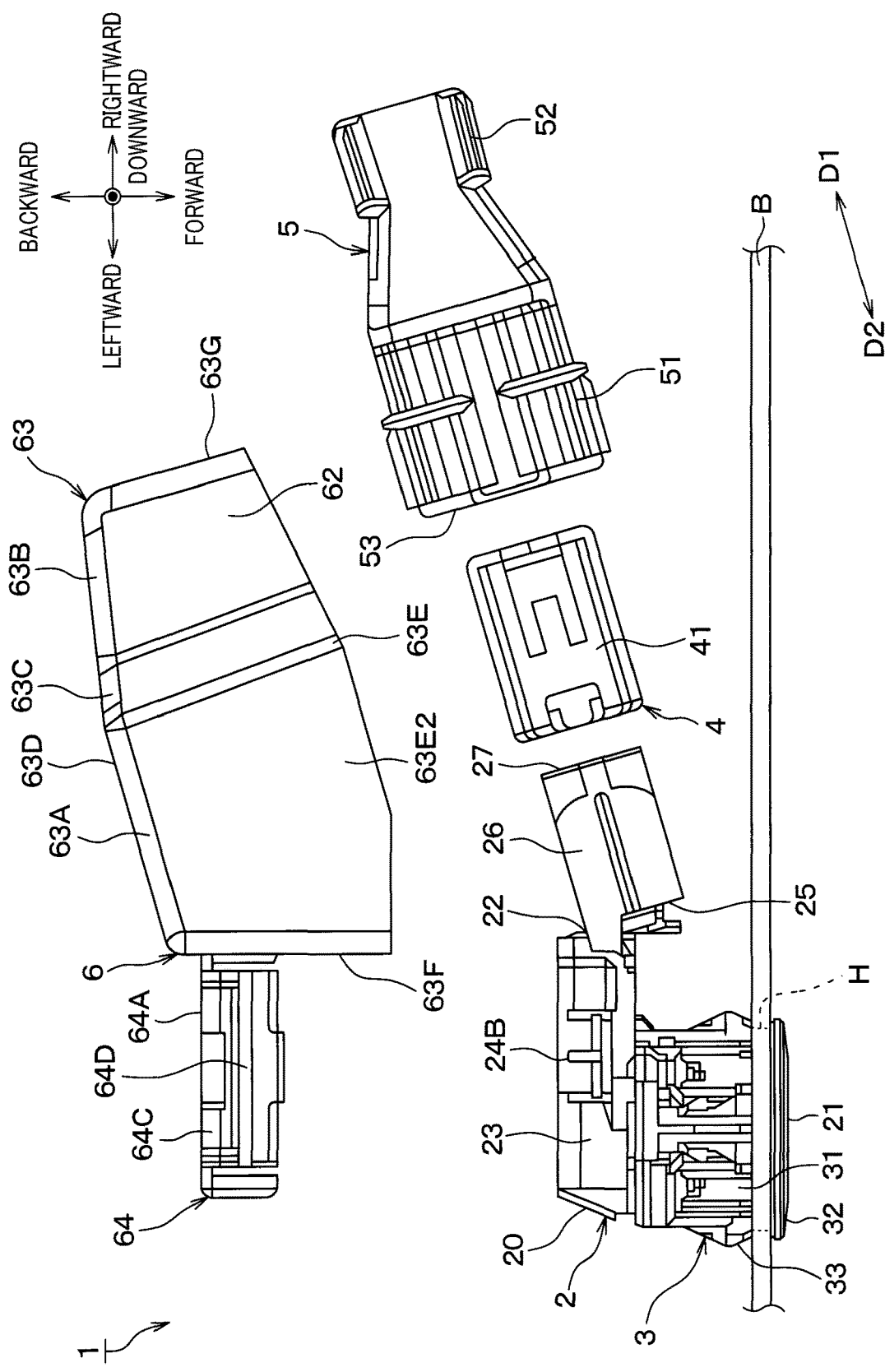
FIG. 7 is an exploded perspective view of the bottom of on-vehicle device illustrated in FIG. 4.
Figure 8:
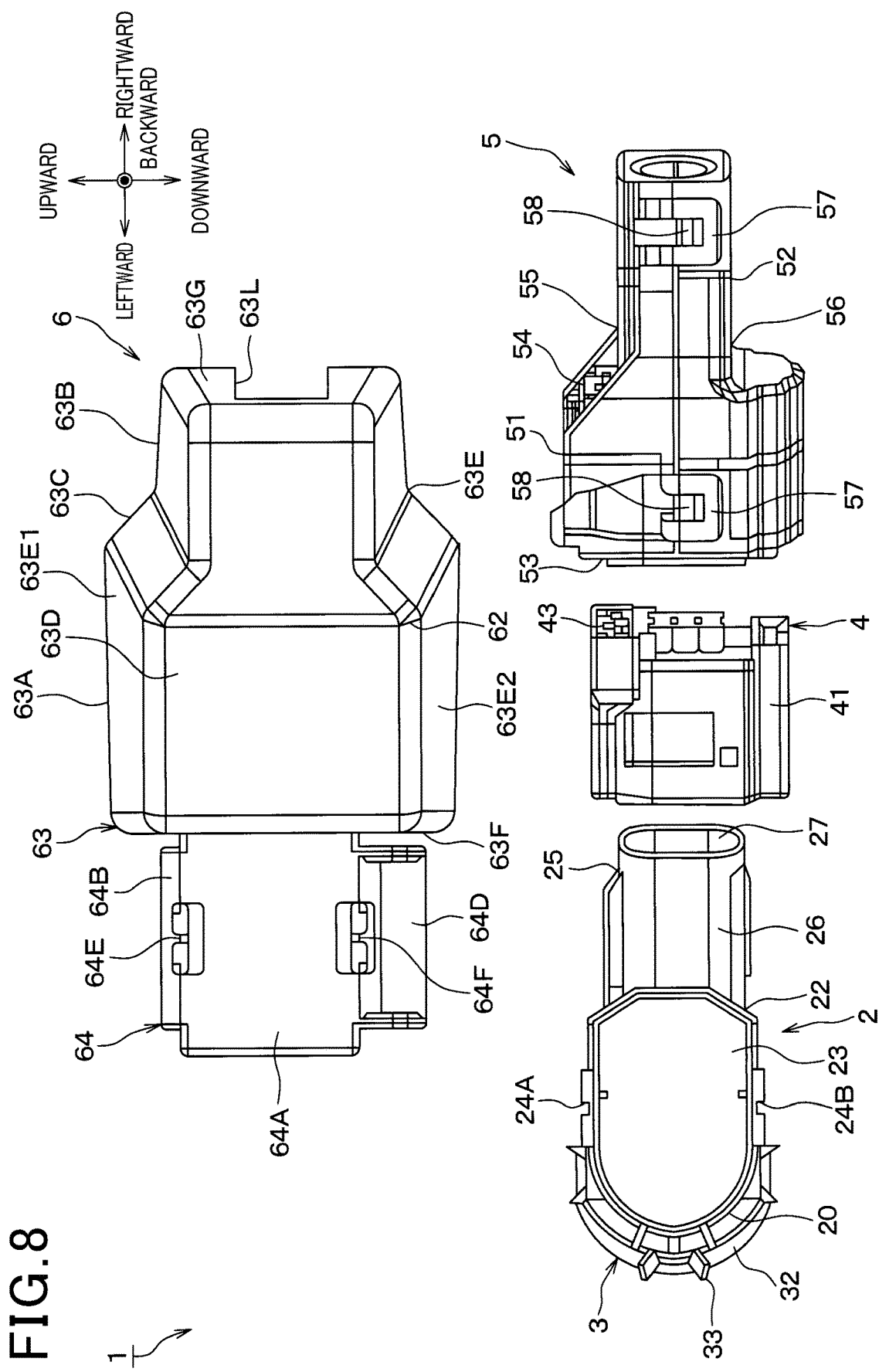
FIG. 8 is a further exploded rear view of the on-vehicle device illustrated in FIG. 5.

A configuration of an on-vehicle device 1 according to a first embodiment will be described with reference to FIG. 1 to FIG. 11. As illustrated in FIG. 1, the on-vehicle device 1 includes an on-vehicle sensor 2 to be mounted on a vehicle body component B. A vehicle on which the on-vehicle device 1 according to the present embodiment is to be mounted will be hereinafter referred to as an "own vehicle".

FIG. 1 illustrates the on-vehicle device 1 in an on-vehicle state. Note that respective directions of "forward", "backward", "leftward", "rightward", "upward" and "downward" directions are set in FIG. 1 to FIG. 11 for the purpose of illustration. These directions are merely set for convenience sake to simplify description of components and functions of respective portions of the on-vehicle device 1 and do not limit the present disclosure.

[Overall Configuration]

An overall configuration of the on-vehicle device 1 will be described first. In the present embodiment, the vehicle body component B on which the on-vehicle device 1 is to be mounted is a plate-like bumper cover and has a mounting hole H which is a through-hole which passes through in a front-back direction. FIG. 1 illustrates an example of an on-vehicle state in a case where the vehicle body component B is a front bumper cover. The on-vehicle sensor 2, which is an ultrasonic sensor which detects an obstacle existing around the own vehicle, can transmit and receive ultrasonic waves. The on-vehicle sensor 2 is mounted on the mounting hole H via an accessory component 3.

The on-vehicle sensor 2 is electrically connected to a wiring W by being coupled to a wiring-side connector 4 provided on the wiring W side. The wiring-side connector 4 is mounted at a distal end of the wiring W. An electrical connection between the on-vehicle sensor 2 and the wiring W, that is, a coupling portion between the on-vehicle sensor 2 and the wiring-side connector 4 will be hereinafter referred to as a "connector coupling portion CC". In the example in FIG. 1, the connector coupling portion CC is stored inside the front bumper cover. Configurations of the on-vehicle sensor 2, the accessory component 3 and the wiring-side connector 4 will be described in detail later.

An inner cover 5 is mounted on the connector coupling portion CC. In the present embodiment, the inner cover 5 is formed so as to be mounted on the wiring-side connector 4. Further, the wiring-side connector 4 is detachable from the on-vehicle sensor 2 in a state where the inner cover 5 is mounted on the wiring-side connector 4. Note that "detachable" refers to relatively easy attachment and removal through manipulation by the fingers of a worker as well as physically detachable. In a case of "detachable", typically, attachment and removal operation can be completed only through simple manipulation by the fingers of the worker without the need of a tool. A configuration of the inner cover 5 will be described in detail later.

The protective cover 6 protects the connector coupling portion CC. In other words, the protective cover 6 is provided to prevent foreign matter such as water from entering the connector coupling portion CC by preventing adhesion of mud, snow, ice, or the like, to the inner cover 5. Specifically, the protective cover 6 is formed to cover the inner cover 5 from above, below and behind in an on-vehicle state where the protective cover 6 is fixed on the on-vehicle sensor 2 side and mounted on the own vehicle. A state where the protective cover 6 is fixed on the on-vehicle sensor 2 side will be hereinafter referred to as a "fixed state". A configuration of the protective cover 6 will be described in detail later.

[On-Vehicle Sensor]

Details of respective parts constituting the on-vehicle device 1 will be described next. A chassis 20 of the on-vehicle sensor 2 is formed with a synthetic resin, for example, a rigid synthetic resin such as polybutylene telephthalate. The on-vehicle sensor 2 includes a cylindrical portion 21 and a body portion 22.

The cylindrical portion 21 projects toward an ultrasonic wave transmission direction (that is, forward in the drawing) from the body portion 22. The cylindrical portion 21 is formed in a substantially cylindrical shape having a center axis line which is parallel to the ultrasonic wave transmission direction. In other words, the cylindrical portion 21 is formed so that the center axis line of the substantially cylindrical shape matches a directional center axis of the on-vehicle sensor 2. An ultrasonic microphone which is not illustrated and which can transmit and receive ultrasonic waves is provided at the cylindrical portion 21.

The body portion 22 constituting a main portion of the chassis 20 includes a box portion 23. The box portion 23 is formed in a box shape having a longitudinal direction in a left-right direction, having a width direction in an up-down direction, and having a thickness direction in a front-back direction. The up-down direction (vertical direction) in the drawing which is the width direction of the box portion 23 will be hereinafter sometimes referred to as a "sensor width direction". Further, the left-right direction (horizontal direction) in the drawing which is the longitudinal direction of the box portion 23 will be hereinafter sometimes referred to as a "sensor longitudinal direction". A circuit substrate, or the like, which is not illustrated is stored in the box portion 23.

As illustrated in FIG. 4 to FIG. 9, a first engaged portion 24A and a second engaged portion 24B are provided at the box portion 23. The first engaged portion 24A and the second engaged portion 24B are formed as a projection and/or a recess. The first engaged portion 24A and the second engaged portion 24B engage with the protective cover 6 side when the protective cover 6 is fixed at the chassis 20 of the on-vehicle sensor 2.

The body portion 22 includes a sensor-side connector 25. The sensor-side connector 25, which is a connector provided on the on-vehicle sensor 2 side, extends in an extending direction D1 from one end portion in the sensor longitudinal direction, of the box portion 23. In the present embodiment, the sensor-side connector 25 is integrally connected to a right end portion of the box portion 23. The extending direction D1 is a direction orthogonal to both the sensor width direction and the ultrasonic wave transmission direction. Specifically, the extending direction D1 is a direction separate from the vehicle body component B and the cylindrical portion 21 in an on-vehicle state. In the example in FIG. 1, the extending direction D1 is diagonally backward right at an angle of approximately 10° to 15° with respect to the sensor longitudinal direction. A direction opposite to the extending direction D1 will be hereinafter referred to as a "coupling direction D2".

The sensor-side connector 25 includes a connector sleeve 26, and a rod-like male contact which is not illustrated and which extends in the extending direction D1 inside the connector sleeve 26. The connector sleeve 26, which is part of the synthetic resin chassis 20, is formed in a cylindrical shape extending in the extending direction D1. In other words, the box portion 23 and the connector sleeve 26 are seamlessly integrally formed with the same material.

Further, the sensor-side connector 25 includes a connector opening portion 27. The connector opening portion 27 is provided to be open in the extending direction D1 at a distal end portion of the connector sleeve 26, that is, at an end portion in the extending direction D1. The connector opening portion 27 is formed in an elliptical shape having a longitudinal direction in the sensor width direction when viewed with a line of sight parallel to the coupling direction D2.

Figure 9:
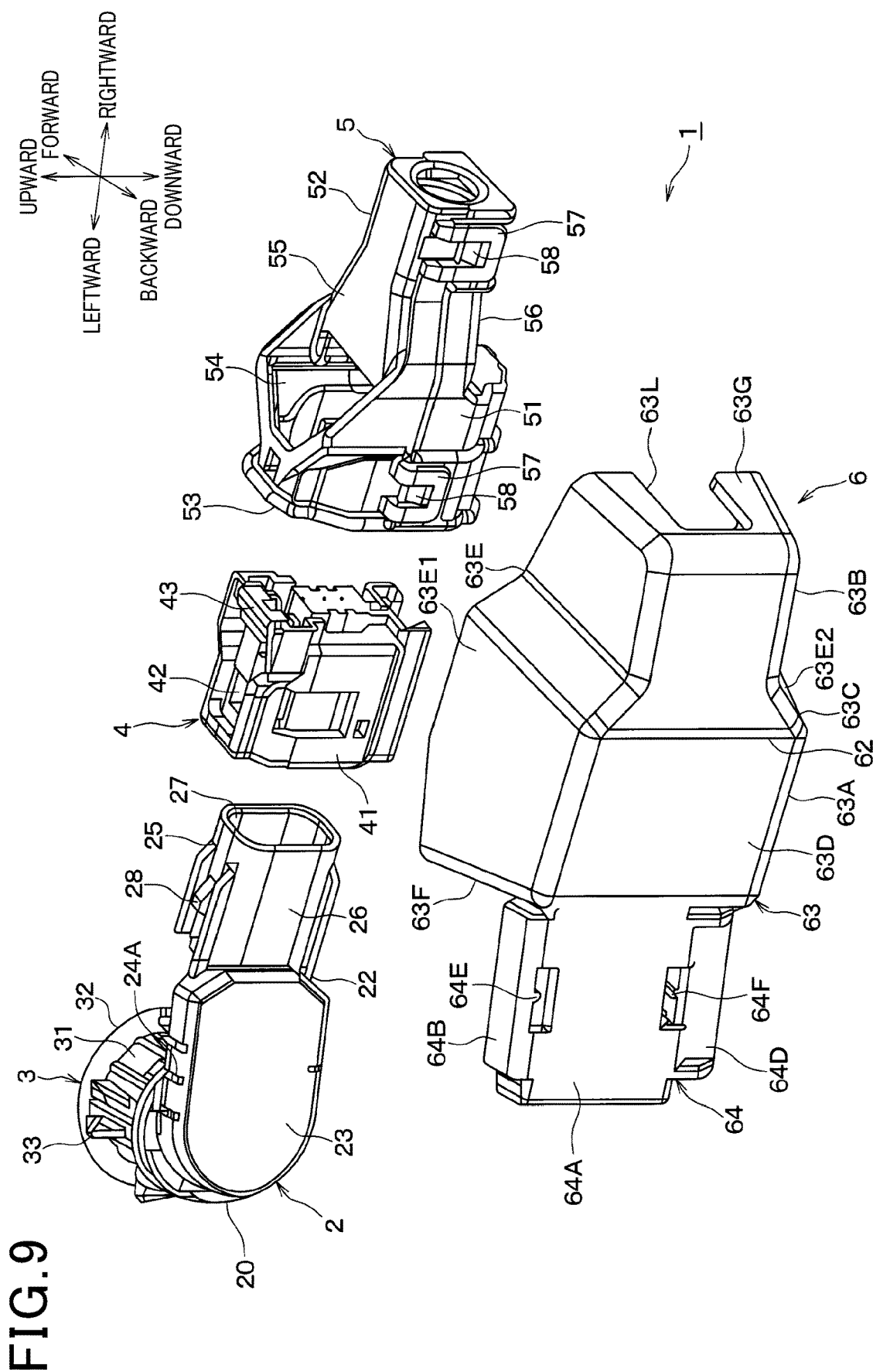
FIG. 9 is a further exploded perspective view of the on-vehicle device illustrated in FIG. 6.

As illustrated in FIG. 9, the sensor-side connector 25 includes an engagement projection 28. The engagement projection 28 is provided at one end portion in the sensor width direction of the connector sleeve 26, which is at an intermediate position in the extending direction D1. The engagement projection 28 is a small projection for maintaining a coupling state between the wiring-side connector 4 and the sensor-side connector 25, and projects in the sensor width direction from an outer surface of the connector sleeve 26.

[Accessory Component]

In the present embodiment, the accessory component 3 is a circular body called a bezel and is formed with a synthetic resin, for example, a rigid synthetic resin such as polyacetal. The accessory component 3 is inserted into the mounting hole H from outside, that is, the outer surface side of the vehicle body component B and accommodates the cylindrical portion 21 of the on-vehicle sensor 2. Specifically, the on-vehicle sensor 2 is fixed at the vehicle body component B by inserting the cylindrical portion 21 of the on-vehicle sensor 2 into the accessory component 3 from inside, that is, an inner surface side of the vehicle body component B in a state where the accessory component 3 is inserted into the mounting hole H from outside of the vehicle body component B. A direction in which the on-vehicle sensor 2 is mounted on the vehicle body component B, that is, a direction in which the cylindrical portion 21 of the on- vehicle sensor 2 is inserted into the accessory component 3 will be hereinafter sometimes referred to as a "mounting direction". The mounting direction is a direction orthogonal to both the sensor width direction and the extending direction D1 and is the same direction as the ultrasonic wave transmission direction in the present embodiment. Further, a direction opposite to the mounting direction will be hereinafter sometimes referred to as a "removal direction". In the example illustrated in FIG. 1, the mounting direction is the forward direction, and the removal direction is the backward direction.

The accessory component 3 includes a bezel body 31, a flange portion 32, and an engagement projection portion 33. The bezel body 31, which is a substantially cylindrical portion, has an outer diameter which allows the bezel body 31 to be inserted into the mounting hole H and an inner diameter which allows the bezel body 31 to accommodate the cylindrical portion 21. The flange portion 32 extends from one end side in an axial direction of the bezel body 31 to outside, that is, in a bezel radial direction so as to abut on the outer surface of the vehicle body component B in an on-vehicle state. The bezel radial direction is a direction extending in a radial manner from a center axis line in the substantially cylindrical shape of the bezel body 31. The engagement projection portion 33 projects in the bezel radial direction from an intermediate position in an axial direction of the bezel body 31. The engagement projection portion 33 is formed so that a portion near an inner edge of the mounting hole H at the vehicle body component B is sandwiched between the engagement projection portion 33 and the flange portion 32 in a state where the accessory component 3 is inserted into the mounting hole H from outside of the vehicle body component B. In the present embodiment, a plurality of engagement projection portions 33 are provided at the bezel body 31.

[Wiring-Side Connector]

The wiring-side connector 4 is coupled to the sensor-side connector 25 while relatively moving in the coupling direction D2 with respect to the sensor-side connector 25. In other words, the connector coupling portion CC is formed by the sensor-side connector 25 of the on-vehicle sensor 2 being coupled to the wiring-side connector 4.

Specifically, the wiring-side connector 4 includes a connector body 41 in a block shape. The connector body 41 is formed in a substantially cuboid shape with a synthetic resin. Specifically, the connector body 41 is formed in a rectangular shape having a longitudinal direction in the sensor width direction when viewed with a line of sight parallel to the extending direction D1. For example, the connector body 41 can be formed with a synthetic resin such as nylon which is softer than a synthetic resin constituting the chassis 20 of the on-vehicle sensor 2.

The connector body 41 has an external shape larger than the connector sleeve 26 when viewed with a line of sight parallel to the extending direction D1, so as to be able to store the connector sleeve 26. Specifically, a groove which is not illustrated, and which corresponds to the cylindrical shape of the connector sleeve 26 is provided at the connector body 41. This groove is formed so as to be close to or make contact with an inner periphery surface and an outer periphery surface of the connector sleeve 26 in a coupling state where the connector coupling portion CC is formed. Further, a female contact which is not illustrated and which corresponds to the male contact of the sensor-side connector 25 is provided at the connector body 41. Note that the coupling state in which the connector coupling portion CC is formed, that is, a coupling state between the wiring-side connector 4 and the sensor-side connector 25 will be hereinafter sometimes simply referred to as a "coupling state".

The connector body 41 includes a projection engagement hole 42. The projection engagement hole 42 is provided to be open in the sensor width direction at one end portion in the sensor width direction of the connector body 41, which is an intermediate position in the extending direction D1. Specifically, the projection engagement hole 42 is disposed at a position corresponding to the engagement projection 28 in the coupling state. In other words, the projection engagement hole 42 is formed to maintain the coupling state by engaging with the engagement projection 28 in the coupling state.

The wiring-side connector 4 further includes an operation portion 43. The operation portion 43 is provided at an end portion in the extending direction D1 of the connector body 41, which is one end portion in the sensor width direction. In other words, the operation portion 43 is disposed at a corner portion most separate from the on-vehicle sensor 2 in the coupling state, at the wiring-side connector 4. The connector body 41 which is a main portion of the wiring-side connector 4 and the operation portion 43 which is part of the wiring-side connector 4 are seamlessly integrally formed with the same material.

The operation portion 43 projects in the extending direction D1 so as to be depressed along the sensor width direction when the wiring-side connector 4 is removed from the sensor-side connector 25. In other words, the operation portion 43 is formed to facilitate release of the coupling state between the projection engagement hole 42 and the engagement projection 28 by being depressed.

[Inner Cover]

The inner cover 5, which is called a "chipping protective cover", protects the connector coupling portion CC from a flying pebble, or the like, by covering the connector coupling portion CC. The inner cover 5 is formed with a synthetic resin. Specifically, for example, the inner cover 5 can be formed with the same type of the synthetic resin which constitutes the chassis 20 of the on-vehicle sensor 2 or a synthetic resin (such as polyethylene) which is softer than the synthetic resin which constitutes the chassis 20. The inner cover 5 includes a connector storage portion 51 which accommodates the wiring-side connector 4, and a wiring protection portion 52 which protects the wiring W.

In the present embodiment, the connector storage portion 51 is provided to store most parts of the wiring-side connector 4. Specifically, the connector storage portion 51 is formed to expose an end portion in the coupling direction D2 of the wiring-side connector 4 while accommodating other portions. The wiring protection portion 52 is disposed ahead of the connector store portion 51 in the extending direction D1. The wiring protection portion 52 is provided to protect a portion which is a distal end portion of the wiring W and which projects in the extending direction D1 from the wiring-side connector 4. The wiring protection portion 52 is formed to have a smaller dimension in the sensor width direction and in the up-down direction than a dimension of the connector storage portion 51. The connector storage portion 51 and the wiring protection portion 52 are seamlessly integrally formed with the same material in the extending direction D1.

The inner cover 5 includes a storage opening portion 53 and an operation opening portion 54. The storage opening portion 53, which is an opening portion of internal space for storing the wiring-side connector 4, is provided to be open in the coupling direction D2. Such internal space is provided such that an inner wall surface of the internal space faces and abuts on an outer wall surface of the connector body 41 at the wiring-side connector 4. The operation opening portion 54 is provided at the connector storage portion 51 so that the operation portion 43 is exposed to outside in a state where the inner cover 5 is mounted on the wiring-side connector 4. Specifically, the operation opening portion 54 is disposed at one end portion in the sensor width direction of the connector storage portion 51, which is an end portion in the extending direction D1.

In the present embodiment, the inner cover 5 is divided into two portions in the sensor width direction. In other words, the inner cover 5 includes a first inner cover 55 and a second inner cover 56. The first inner cover 55 and the second inner cover 56 are detachable by moving relatively with respect to each other in the sensor width direction. The first inner cover 55 and the second inner cover 56 are formed with the same material.

The first inner cover 55 includes the operation opening portion 54 and a first engagement portion 57. The first engagement portion 57, which is a tongue piece portion extending in the sensor width direction toward the second inner cover 56, is formed in a substantially U-shape whose tip portions are closed The second inner cover 56 includes a second engagement portion 58. The second engagement portion 58, which is a projection which is to engage with the first engagement portion 57, projects in a direction orthogonal to both the sensor width direction and the extending direction D1. The first engagement portion 57 and the second engagement portion 58 are respectively provided at the connector storage portion 51 and the wiring protection portion 52.

[Protective Cover]

The protective cover 6 is formed with a plate material made of a synthetic resin, for example, a rigid synthetic resin such as polyacetal. An inner surface 61 of the protective cover 6, which is a surface facing the on-vehicle sensor 2 and the inner cover 5 in a fixed state, has water-repellent properties. Specifically, the inner surface 61 is formed by coating a water-repellent material on a surface of the above-described synthetic resin which constitutes a body portion of the protective cover 6. In a similar manner, an outer surface 62 of the protective cover 6, which is a surface opposite to the inner surface 61, has water-repellent properties.

[Protection Portion]

In the present embodiment, the protection portion 63 which constitutes a main portion of the protective cover 6 is provided so as to correspond to the whole of the inner cover 5 in the fixed state. In other words, the protection portion 63 is formed in a shape of a bathtub which is open toward the inner cover 5 so as to further cover the inner cover 5 which covers the connector coupling portion CC in a state where the protective cover 6 is fixed on the on-vehicle sensor 2 side. In other words, the protection portion 63 is provided to cover the connector coupling portion CC and the operation opening portion 54. Further, the protection portion 63 includes the inner surface 61 and the outer surface 62 which have water-repellent property.

In the present embodiment, the protection portion 63 includes a proximal portion 63A, a distal portion 63B and an intermediate portion 63C which are three portions arranged in the extending direction D1. The proximal portion 63A is provided so as to correspond to the connector storage portion 51. The distal portion 63B is provided ahead of the proximal portion 63A in the extending direction D1 so as to correspond to the wiring protection portion 52. The distal portion 63B is formed so as to have a smaller dimension in the sensor width direction than a dimension of the proximal portion 63A. The intermediate portion 63C is provided between the proximal portion 63A and the distal portion 63B so as to connect the proximal portion 63A and the distal portion 63B. The proximal portion 63A, the distal portion 63B and the intermediate portion 63C are seamlessly integrally formed with the same material.

The protection portion 63 is formed with four plate-like portions, that is, a rear wall portion 63D, a side wall portion 63E, a proximal wall portion 63F and a distal wall portion 63G. The rear wall portion 63D, the side wall portion 63E, the proximal wall portion 63F and the distal wall portion 63G are seamlessly integrally formed with the same material.

The rear wall portion 63D, which is a plate-like portion having a sheet thickness direction along the mounting direction, is provided so as to be disposed along the vehicle body component B in the on-vehicle state. In other words, the rear wall portion 63D extends in the sensor longitudinal direction. Further, the rear wall portion 63D is provided so as to face the vehicle body component B in an aspect where the inner surface 61 faces the vehicle body component B in the on-vehicle state.

The rear wall portion 63D is provided to cover the connector coupling portion CC by adjoining the connector coupling portion CC along the mounting direction. Specifically, the rear wall portion 63D faces the vehicle body component B across the inner cover 5 in the on-vehicle state.

The side wall portion 63E, which is a plate-like portion having a sheet thickness direction along the sensor width direction, is provided to cover the connector coupling portion CC by adjoining the connector coupling portion CC along the sensor width direction. In other words, the side wall portion 63E is disposed on both sides of the inner cover 5 in the sensor width direction. Specifically, the side wall portion 63E extends along the mounting direction from both end portions in the sensor width direction of the rear wall portion 63D.

Further, in the present embodiment, a pair of side wall portions 63E is formed in a folding-fan shape so as to be separate from each other toward the mounting direction. In other words, one of the pair of side wall portions 63E includes a first inclined surface 63E1. Further, the other of the pair of the side wall portions 63E includes a second inclined surface 63E2. The first inclined surface 63E1 is provided on the inner surface 61 and the outer surface 62. In a similar manner, the second inclined surface 63E2 is provided on the inner surface 61 and the outer surface 62. The first inclined surface 63E1 and the second inclined surface 63E2 are formed in a substantially planar shape.

The first inclined surface 63E1, which is a surface located on an upper side out of the pair of side wall portions 63E in the on-vehicle state, is formed to incline with respect to the sensor width direction. Specifically, the first inclined surface 63E1 is provided to head downward to the rear wall portion 63D in the on-vehicle state. On the other hand, the second inclined surface 63E2, which is a surface located on a lower side out of the pair of the side wall portions 63E in the on-vehicle state, is formed to incline with respect to the sensor width direction. Specifically, the second inclined surface 63E2 is provided to head upward to the rear wall portion 63D in the on-vehicle state.

In this manner, the first inclined surface 63E1 and the second inclined surface 63E2 are provided so that a normal line in a direction separate from the connector coupling portion CC matches a direction separate from the vehicle body component B. Further, in the present embodiment, the first inclined surface 63E1 and the second inclined surface 63E2 are provided so that an angle formed by the above-described normal line and the sensor width direction becomes equal to or larger than 10°. In other words, the first inclined surface 63E1 and the second inclined surface 63E2 are formed so that adhered water droplets smoothly drop below the protective cover 6 by moving downward by the action of gravity without remaining inside the protective cover 6.

The proximal wall portion 63F, which is a plate-like portion having a sheet thickness direction along the sensor longitudinal direction, extends along the mounting direction. The proximal wall portion 63F is integrally connected to end portions on the coupling direction D2 side of the rear wall portion 63D and the pair of the side wall portions 63E. The proximal wall portion 63F is provided so as to cover the coupling direction D2 side of the storage opening portion 53. In other words, the proximal wall portion 63F is disposed ahead of the storage opening portion 53 in the coupling direction D2 in the coupling state so as to cover the storage opening portion 53 from one side in the sensor longitudinal direction.

Figure 10:
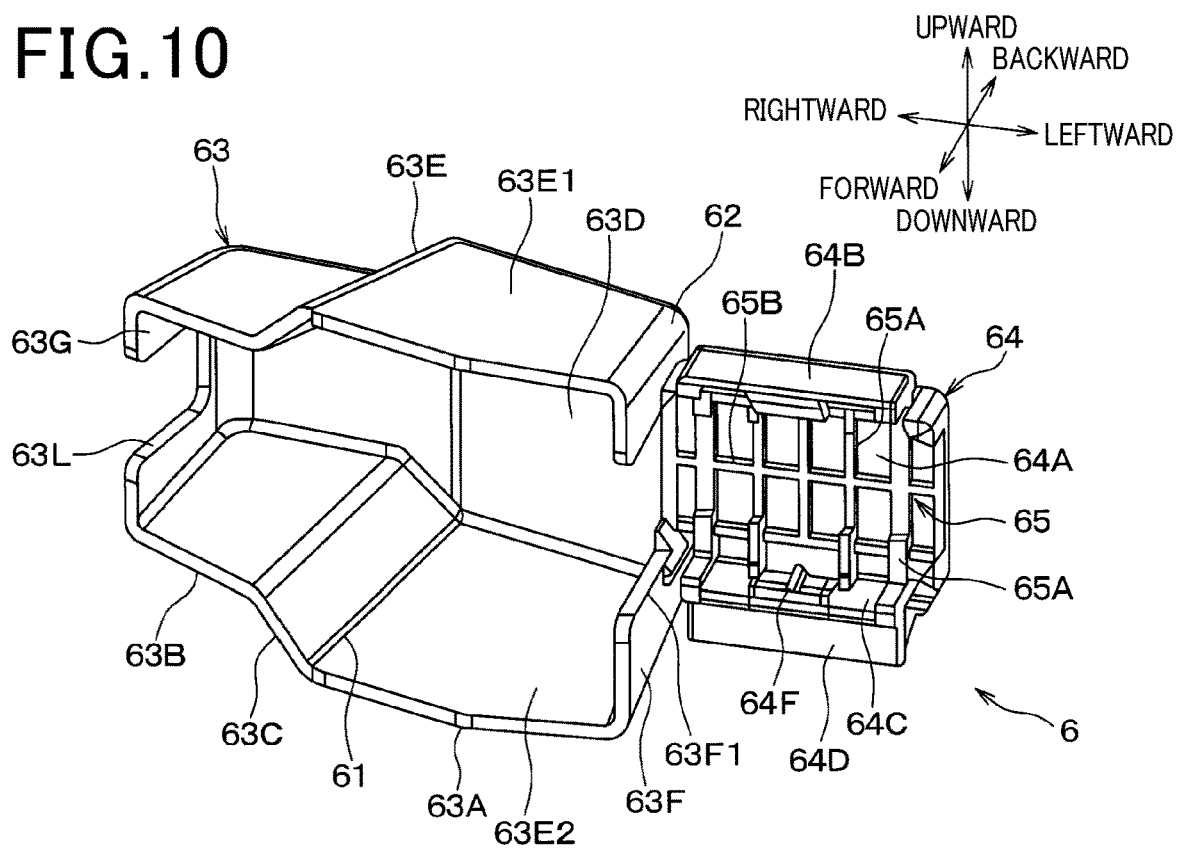
FIG. 10 is a perspective view of a protective cover illustrated in FIG. 1 to FIG. 9.

As illustrated in FIG. 10, an exposure opening portion 63F1 is formed at the proximal wall portion 63F. The exposure opening portion 63F1 is provided at a central portion in the sensor width direction of the proximal wall portion 63F so as to expose the wiring-side connector 4 in the coupling direction D2. In other words, the proximal wall portion 63F is formed in a substantially U-shape which is open on the mounting direction side while a portion adjacent to the rear wall portion 63D is blocked.

The distal wall portion 63G, which is a plate-like portion having a sheet thickness direction along the extending direction D1, extends along the mounting direction. The distal wall portion 63G is integrally connected to end portions on the extending direction D1 side of the rear wall portion 63D and the pair of side wall portions 63E. In other words, the distal wall portion 63G is provided ahead of the wiring protection portion 52 in the extending direction D1 so as to cover a portion of the wiring W exposed from the wiring protection portion 52 of the inner cover from the other side in the sensor longitudinal direction.

A cutout portion 63L is formed at the distal wall portion 63G. The cutout portion 63L is provided at the central portion in the sensor width direction of the distal wall portion 63G so as to allow insertion of the wiring W. In other words, the distal wall portion 63G is formed in a substantially U-shape which is open on the mounting direction side while a portion adjacent to the rear wall portion 63D is closed.

[Fixing Portion]

The protective cover 6 includes a fixing portion 64 in addition to the protection portion 63. The fixing portion 64 is integrally provided with the protection portion 63 so as to be fixed on the on-vehicle sensor 2 side. In the present embodiment, the protection portion 63 and the fixing portion 64 are seamlessly integrally formed with the same material. The fixing portion 64 is provided ahead of the protection portion 63 in the coupling direction D2 and extends in the sensor longitudinal direction from the proximal wall portion 63F of the protection portion 63. In other words, the protection portion 63 extends in the extending direction D1 from the fixing portion 64.

The fixing portion 64 includes a rear plate portion 64A, a first projection portion 64B, a second projection portion 64C, and a tongue piece portion 64D. The rear plate portion 64A, the first projection portion 64B, the second projection portion 64C, and the tongue piece portion 64D are seamlessly integrally formed with the same material.

The rear plate portion 64A, which is a portion in a substantially planner shape having a sheet thickness direction in the mounting direction, extends along the sensor longitudinal direction from the proximal wall portion 63F of the protection portion 63. In other words, the rear plate portion 64A is provided so as to face the box portion 23 in the chassis 20 of the on-vehicle sensor 2 in the fixed state. The rear plate portion 64A faces the vehicle body component B across the box portion 23 in the on-vehicle sensor 2 by being provided along the vehicle body component B in the on-vehicle state. In other words, the rear plate portion 64A is provided to shield the box portion 23 in the on-vehicle sensor 2 from behind.

The first projection portion 64B extends in the mounting direction from one end portion in the sensor width direction of the rear plate portion 64A. The first projection portion 64B, which is a portion in a substantially planar shape having a sheet thickness direction in the sensor width direction, is formed in a rectangular shape having a longitudinal direction in the sensor longitudinal direction. The first projection portion 64B is provided above the second projection portion 64C in the on-vehicle state. The second projection portion 64C extends in the mounting direction from the other end portion in the sensor width direction of the rear plate portion 64A. The second projection portion 64C, which is a portion in a substantially planar shape having a sheet thickness direction in the sensor width direction, is formed in a rectangular shape having a longitudinal direction in the sensor longitudinal direction.

The second projection portion 64C is formed in a shape which is substantially plane-symmetrical to the first projection portion 64B so as to overlap with the first projection portion 64B when viewed parallel to the sensor width direction. In other words, the first projection portion 64B and the second projection portion 64C are disposed to face each other across the box portion 23. In other words, the first projection portion 64B and the second projection portion 64C are respectively provided to shield the box portion 23 in the on-vehicle sensor 2 from above and below. The tongue piece portion 64D, which is used as a clue to remove the protective cover 6 from the on-vehicle sensor 2 and which is a portion in a substantially planar shape having a sheet thickness direction in the mounting direction, extends in the sensor width direction from the second projection portion 64C.

In the present embodiment, the protective cover 6 is directly fixed on the on-vehicle sensor 2. In other words, the first projection portion 64B and the second projection portion 64C are provided to sandwich the box portion 23 in the chassis 20 of the on-vehicle sensor 2 from both sides in the sensor width direction in the fixed state.

A first engagement portion 64E is provided at the first projection portion 64B. The first engagement portion 64E is formed as a projection and/or a recess so as to engage with the first engaged portion 24A provided at the box portion 23. In a similar manner, a second engagement portion 64F is provided at the second projection portion 64C. The second engagement portion 64F is formed as a projection and/or a recess so as to engage with the second engaged portion 24B provided at the box portion 23.

Figure 11:
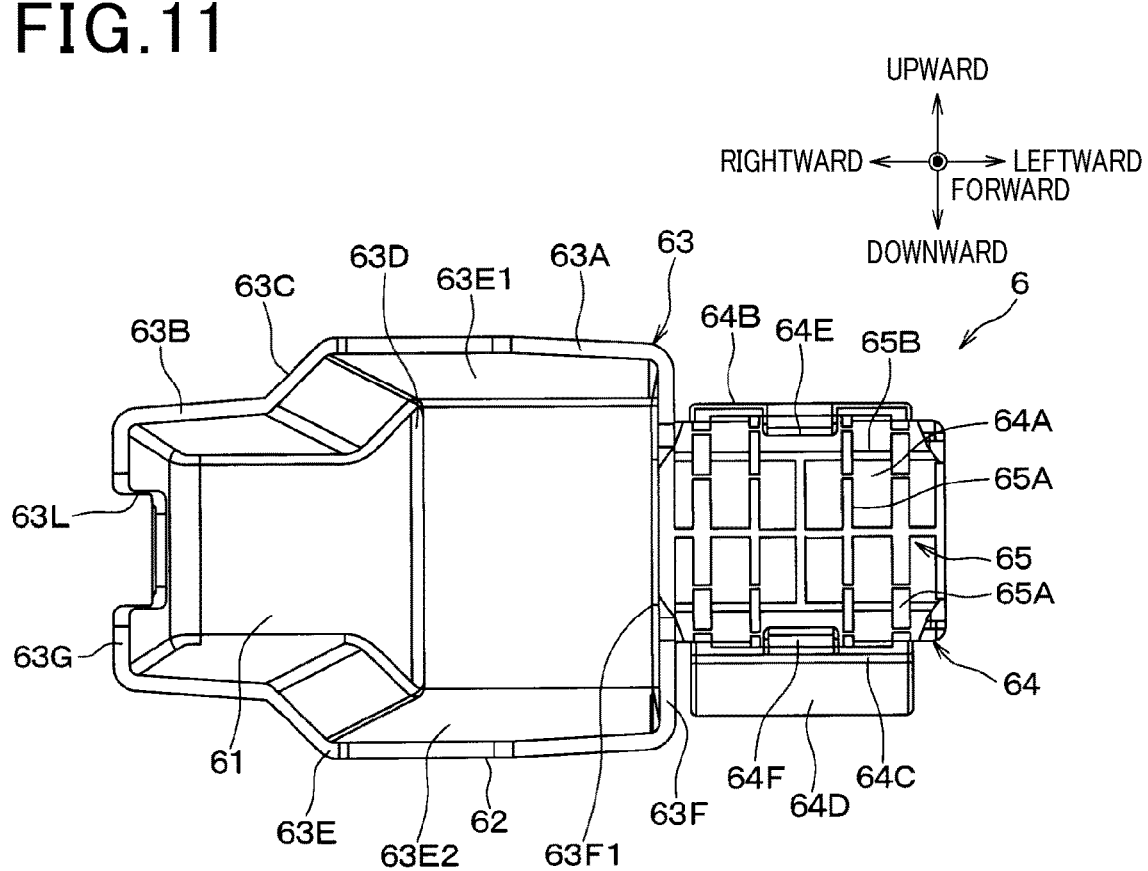
FIG. 11 is a front view of the protective cover illustrated in FIG. 10.

As illustrated in FIG. 10 and FIG. 11, the protective cover 6 further includes a reinforcement portion 65 for reinforcing the connection portion between the protection portion 63 and the fixing portion 64, and the fixing portion 64. In other words, the reinforcement portion is provided to prevent deformation of the fixing portion 64 or deformation of the connection portion between the protection portion 63 and the fixing portion 64.

Specifically, in the present embodiment, the reinforcement portion 65 is formed with a lateral rib 65A and a vertical rib 65B. The lateral rib 65A and the vertical rib 65B are ribs projecting along the sheet thickness direction of a plate-like portion (that is, the rear plate portion 64A) which constitutes the protective cover 6. In other words, the lateral rib 65A and the vertical rib 65B project in the mounting direction from a surface which faces the on-vehicle sensor 2 in the fixed state of the rear plate portion 64A. A plurality of the lateral ribs 65A and the vertical ribs 65B are formed.

In the present embodiment, the lateral rib 65A is formed so as to extend along the sensor width direction. In other words, the lateral rib 65A has a longitudinal direction parallel to the sensor width direction. In contrast, the vertical rib 65B is formed so as to extend along the sensor longitudinal direction which is orthogonal to both the sensor width direction and the mounting direction. In this manner, in the present embodiment, the lateral rib 65A and the vertical rib 65B are provided so that respective longitudinal directions are orthogonal to each other. A plurality of lateral ribs 65A are arranged along the longitudinal direction of the vertical rib 65B and provided over substantially the whole of the rear plate portion 64A. The vertical rib 65B is provided from the connection portion between the protection portion 63 and the fixing portion 64 toward a tip portion of the rear plate portion 64A.

Effects

Effects to be provided by the configuration of the present embodiment will be described below along with outline of operation of attachment and removal of the on-vehicle device 1 to and from the front bumper cover which is the vehicle body component B in the own vehicle.

As an example, in a case where the on-vehicle device 1 according to the present embodiment is mounted on the vehicle body component B, that is, the front bumper cover in the own vehicle, first, the accessory component 3 is mounted on the on-vehicle sensor 2. Specifically, the cylindrical portion 21 of the on-vehicle sensor 2 is inserted into the bezel body 31 of the accessory component 3. Then, the cylindrical portion 21 and the bezel body 31 engage with each other by action of engagement means which is not illustrated. In this event, the wiring-side connector 4 is not yet mounted on the sensor-side connector 25 provided at the on-vehicle sensor 2. It is therefore possible to insert the sensor-side connector 25 into the mounting hole H from a side of the outer surface (that is, front surface) of the vehicle body component B. In other words, the coupled on-vehicle sensor 2 and accessory component 3 is inserted into the mounting hole H from the sensor-side connector 25 side. Subsequently, the body portion 22 of the on-vehicle sensor 2 is inserted into the mounting hole H. Further, the bezel body 31 is inserted into the mounting hole H from the other end side in the axial direction, that is, an opposite side of the flange portion 32. Then, the accessory component 3 is pushed in a removal direction, that is, backward until the flange portion 32 abuts on the outer surface of the vehicle body component B. When the flange portion 32 abuts on the outer surface of the vehicle body component B, the portion near the inner edge of the mounting hole H in the vehicle body component B is sandwiched between the flange portion 32 and the engagement projection portion 33. By this means, the on-vehicle sensor 2 is fixed to the vehicle body component B.

In another example, first, the accessory component 3 is mounted on the vehicle body component B. Specifically, the bezel body 31 in the accessory component 3 is inserted into the mounting hole H from a side of the inner surface (that is, rear surface) of the vehicle body component B. Then, the accessory component 3 is pushed backward until the flange portion 32 abuts on the outer surface of the vehicle body component B. When the flange portion 32 abuts on the outer surface of the vehicle body component B, the portion near the inner edge of the mounting hole H in the vehicle body component B is sandwiched between the flange portion 32 and the engagement projection portion 33. When the accessory component 3 is mounted on the vehicle body component B, the bezel body 31 is open while extending in a removal direction, that is, backward. The on-vehicle sensor 2 is mounted on the accessory component 3 which has been mounted on the vehicle body component B in advance by inserting the cylindrical portion 21 of the on-vehicle sensor 2 into the bezel body 31 from inside of the vehicle body component B. By this means, the on-vehicle sensor 2 is fixed at the vehicle body component B.

Meanwhile, on the wiring W side, the inner cover 5 is mounted on the wiring-side connector 4 which is mounted on a distal end of the wiring W. By this means, a portion which is a distal end portion of the wiring W and which projects in the extending direction D1 from the wiring-side connector 4 is protected from flying stones, or the like. Specifically, for example, the second inner cover 56 is first attached to the wiring-side connector 4. In other words, the wiring-side connector 4 is fitted into a recess which is provided at the second inner cover 56 to constitute substantially half of space for storing the wiring-side connector 4. Then, the first inner cover 55 is overlapped with the second inner cover 56 so that the first engagement portion 57 engages with the second engagement portion 58.

Subsequently, the wiring-side connector 4 is moved relatively with respect to the sensor-side connector 25 in the coupling direction D2. By this means, the sensor-side connector 25 provided at the on-vehicle sensor 2 is coupled to the wiring-side connector 4 on which the inner cover 5 is mounted. In other words, the on-vehicle sensor 2 is electrically connected to the wiring W by the connector coupling portion CC being formed. In this event, a coupling state where the connector coupling portion CC and the on-vehicle sensor 2 are electrically connected to the wiring W is favorably maintained by the projection engagement hole 42 engaging with the engagement projection 28. Note that the on-vehicle sensor 2 may be electrically connected to the wiring W before the on-vehicle sensor 2 is fixed at the vehicle body component B or after the on-vehicle sensor 2 is fixed at the vehicle body component B.

Last, the protective cover 6 is fixed on the on-vehicle sensor 2 side. In other words, the protective cover 6 is mounted on an assembly of the on-vehicle sensor 2, the wiring-side connector 4 and the inner cover 5. By this means, the on-vehicle device 1 is put into the on-vehicle state. Note that the assembly of the on-vehicle sensor 2, the wiring-side connector 4 and the inner cover 5 will be hereinafter referred to as a "sensor assembly".

Specifically, first, a posture of the protective cover 6 is set at a predetermined posture. In this predetermined posture, the inner surface 61 of the protection portion 63 faces the inner cover 5. Further, in this predetermined posture, the fixing portion 64 faces the box portion 23 of the on-vehicle sensor 2. Subsequently, the protective cover 6 in this predetermined posture is moved relatively with respect to the sensor assembly in the mounting direction. Then, the first engagement portion 64E and the second engagement portion 64F provided at the fixing portion 64 engage with the first engaged portion 24A and the second engaged portion 24B provided at the box portion 23. By this means, the protective cover 6 is fixed on the on-vehicle sensor 2 side in a state where the sensor assembly fixed at the vehicle body component B is covered with the protective cover 6. By this means, the sensor assembly fixed at the vehicle body component B is covered with the protective cover 6 from behind, above, below and right in the drawing.

As described above, the on-vehicle device 1 includes the on-vehicle sensor 2 which is an ultrasonic sensor and is mounted on the vehicle body component B such as a front bumper cover. Thus, the on-vehicle device 1 is exposed to an environment where a foreign matter such as rainwater, snow, ice, mud and a flying pebble comes flying or adheres. Environment resistance performance such as waterproof performance of the on-vehicle device 1 can degrade due to adhesion of mud, water, snow or ice, collision of flying stones, or the like. It is therefore necessary to maintain favorable environment resistance performance such as waterproof performance of the on-vehicle device 1, particularly, at the connector coupling portion CC which is a coupling portion of the sensor-side connector 25 and the wiring-side connector 4.

Concerning this point, in the present embodiment, a portion which is a distal end portion of the wiring W and which projects in the extending direction D1 from the wiring-side connector 4 is protected by the inner cover 5. By this means, such a portion is favorably protected from a flying pebble, or the like.

Further, at the protective cover 6 of the present embodiment, the fixing portion 64 to be fixed on the on-vehicle sensor 2 side is integrally provided with the protection portion 63 which covers the connector coupling portion CC. Thus, if the fixing portion 64 at the protective cover 6 is fixed on the on-vehicle sensor 2 side, the protection portion 63 at the protective cover 6 covers the connector coupling portion CC. By this means, it is possible to further improve environment resistance performance such as waterproof performance at the on-vehicle sensor 2 and the on-vehicle device 1 including the on-vehicle sensor 2, particularly at the connector coupling portion CC.

In the present embodiment, the protection portion 63 covers the connector coupling portion CC in a state where the protective cover 6 is mounted on the connector coupling portion CC. In other words, the protective cover 6 further covers the inner cover 5 which covers the connector coupling portion CC including the wiring-side connector 4. Thus, according to such a configuration, it is possible to further improve environment resistance performance such as waterproof performance at the on-vehicle sensor 2 and the on-vehicle device 1 including the on-vehicle sensor 2.

There is a case where the on-vehicle sensor 2 is electrically disconnected from the wiring W for the purpose of replacement of components, maintenance and inspection, or the like. In this case, first, the protective cover 6 is removed from the sensor assembly. Specifically, a worker puts his/her finger on the tongue piece portion 64D and pulls the tongue piece portion 64D backward. By this means, the first engaged portion 24A is easily disengaged from the first engagement portion 64E, and the second engaged portion 24B is easily disengaged from the second engagement portion 64F. Then, the wiring-side connector 4 is decoupled from the sensor-side connector 25. In other words, the wiring-side connector 4 is extracted in the extending direction D1.

Concerning this point, in the present embodiment, the inner cover 5 is mounted on the wiring-side connector 4. Further, the inner cover 5 includes the operation opening portion 54. The operation opening portion 54 exposes the operation portion 43 which is part of the wiring-side connector 4 to outside of the inner cover 5 in a state where the inner cover 5 is mounted on the wiring-side connector 4.

According to such a configuration, even if the wiring-side connector 4 is covered with the inner cover 5, the operation portion 43 is exposed from the operation opening portion 54. Thus, the projection engagement hole 42 is easily disengaged from the engagement projection 28 by the operation portion 43 being depressed, so that extraction of the wiring-side connector 4 is facilitated.

In this manner, the inner cover 5 is open so as to expose the operation portion 43 which is part of the wiring-side connector 4 at the operation opening portion 54. It is therefore necessary to prevent entry of rainwater, or the like, from the operation opening portion 54.

Thus, in the present embodiment, the operation opening portion 54 is covered with the protection portion 63 at the protective cover 6. Thus, according to such a configuration, it is possible to favorably prevent entry of rainwater, or the like, from the operation opening portion 54.

In the present embodiment, the inner cover 5 includes the storage opening portion 53. The storage opening portion 53 is an opening portion of internal space of the inner cover 5. Such an internal space accommodates the wiring-side connector 4 in a state where the storage opening portion 53 is open in the coupling direction D2. In other words, the storage opening portion 53 is blocked by the wiring-side connector 4 in a state where the storage opening portion 53 is open in the coupling direction D2. Further, the inner wall surface of the internal space of the inner cover 5 faces and abuts on the outer wall surface of the connector body 41 of the wiring-side connector 4 in the coupling state. Thus, a portion at which the inner wall surface of the internal space of the inner cover 5 abuts on the outer wall surface of the connector body 41 of the wiring-side connector 4 is exposed to outside of the inner cover 5 at the storage opening portion 53.

Concerning this point, the protection portion 63 of the protective cover 6 includes the proximal wall portion 63F which is a plate-like portion having a sheet thickness direction along the extending direction D1. The proximal wall portion 63F covers the coupling direction D2 side of the storage opening portion 53. In other words, the proximal wall portion 63F covers the storage opening portion 53 from the coupling direction D2 side or from a left side in the drawing by being provided ahead of the storage opening portion 53 in the coupling direction D2 in the coupling state. Thus, according to such a configuration, it is possible to favorably prevent entry of rainwater, or the like, from the storage opening portion 53.

In the present embodiment, the protection portion 63 includes the rear wall portion 63D and the side wall portion 63E. The rear wall portion 63D, which is a plate-like portion having a sheet thickness direction along the mounting direction, covers the connector coupling portion CC by adjoining the connector coupling portion CC along the mounting direction. The side wall portion 63E, which is a plate-like portion having a sheet thickness direction along the sensor width direction, covers the connector coupling portion CC by adjoining the connector coupling portion CC along the sensor width direction.

In such a configuration, the connector coupling portion CC is favorably covered with the rear wall portion 63D and the side wall portion 63E in the on-vehicle state. Thus, according to such a configuration, it is possible to further improve environment resistance performance such as waterproof performance at the on-vehicle sensor 2 and the on-vehicle device 1 including the on-vehicle sensor 2.

In the present embodiment, the side wall portion 63E includes the first inclined surface 63E1 and the second inclined surface 63E2 which incline with respect to the sensor width direction. The first inclined surface 63E1 and the second inclined surface 63E2 are provided so that a normal line in a direction separate from the connector coupling portion CC, that is, the inner cover 5 matches a direction separate from the vehicle body component B.

According to such a configuration, it is possible to make the first inclined surface 63E1 and the second inclined surface 63E2 descending slopes in the on-vehicle state. Thus, according to such a configuration, it is possible to favorably prevent rainwater, or the like, from remaining on a surface or inside of the protective cover 6.

The vehicle body component B on which the on-vehicle device 1 including the on-vehicle sensor 2 which is an ultrasonic sensor, is to be mounted is an outer plate member such as a bumper cover and a body panel. An angle formed by such an outer plate member and a gravity action direction in a state where the own vehicle is placed on a horizontal plane is normally equal to or less than 10°.

Thus, in the present embodiment, the first inclined surface 63E1 and the second inclined surface 63E2 are provided so that an angle formed by a normal line and the sensor width direction becomes equal to or greater than 10°. According to such a configuration, it is possible to reliably make the first inclined surface 63E1 and the second inclined surface 63E2 descending slopes in the on-vehicle state. Thus, according to such a configuration, it is possible to favorably prevent rainwater, or the like, from remaining on a surface or inside of the protective cover 6.

In the present embodiment, the protection portion 63 includes the inner surface 61 and the outer surface 62 which are water-repellent surfaces. Particularly, in the present embodiment, the first inclined surface 63E1 and the second inclined surface 63E2 are water-repellent surfaces. Thus, according to such a configuration, it is possible to favorably prevent foreign matter from adhering to the surface of the protective cover 6 or prevent rainwater, or the like, from remaining on the surface or inside of the protective cover 6.

In the present embodiment, the protective cover 6 includes the reinforcement portion 65. Specifically, the reinforcement portion 65 is formed with the lateral rib 65A and the vertical rib which project along the sheet thickness direction of the rear plate portion 64A. By this means, it is possible to favorably prevent deformation of the fixing portion 64 or deformation of the connection portion between the protection portion 63 and the fixing portion 64. Further, a defect of the fixing portion 64 being unintentionally removed from the on-vehicle sensor 2 due to vibration, or the like, while the own vehicle is traveling is favorably prevented.

Second Embodiment

The on-vehicle device 1 and the protective cover 6 according to a second embodiment will be described with reference to FIG. 12 to FIG. 15.

In the following description of the second embodiment, configurations and effects of a part which is different from the above-described first embodiment will be mainly described. Note that the same reference numerals will be assigned to portions which are identical with or equivalent to each other in the above-described first embodiment and the second embodiment in the specification and the drawings. Thus, in the following description of the second embodiment, the description of the above-described first embodiment can be employed as appropriate regarding components having reference numerals which are the same as those in the above-described first embodiment unless technical contradictions occur or unless otherwise additionally described. The same will apply to a third embodiment and subsequent embodiments.

In the present embodiment, the protective cover 6 further includes a wiring facing portion 66. The wiring facing portion 66 extends in the extending direction D1 from the distal wall portion 63G of the protection portion 63 so as to face the distal end portion of the wiring W extending from the wiring-side connector 4. In other words, the wiring facing portion 66 covers a portion which is the distal end portion of the wiring W and which projects in the extending direction D1 from the distal wall portion 63G. Further, the wiring facing portion 66 is provided to be fixed at the wiring W.

In the examples in FIG. 12 to FIG. 15, the wiring facing portion 66 is formed as a plate-like portion which is bent in a U-shape or in a substantially V-shape when viewed parallel to the coupling direction D2. Specifically, the wiring facing portion 66 is provided to be open in a direction which is the same as a direction in which the protection portion 63 is open, that is, the mounting direction. The wiring facing portion 66 is provided so as to enclose the wiring W from three directions of behind, above and below in the on-vehicle state.

In the present embodiment, the wiring facing portion 66 is provided to be fixed at the wiring W using a tie T. As the tie T, an adhesive tape, a cable tie, or the like, can be used. Then, the protection portion 63 is provided so as to be slidable relatively with respect to the connector coupling portion CC around a point at which the wiring facing portion 66 is fixed at the wiring W.

According to such a configuration, the protective cover 6 is fixed at two points on the on-vehicle sensor 2 side and on the wiring W side. The fixing point on the on-vehicle sensor 2 side is a point at which the chassis 20 of the on-vehicle sensor 2 engages with the fixing portion 64 provided at an end portion of the protective cover 6 in the coupling direction D2. Further, the fixing point on the wiring W side is a point at which the wiring facing portion 66 provided at an end portion of the protective cover 6 in the extending direction D1 is fixed at the wiring W with the tie T. By this means, the protective cover 6 is more reliably fixed and held on the vehicle body component B side. Further, load on the on-vehicle sensor 2 side due to weight of the protective cover 6 is reduced. Further, by using an adhesive tape as the tie T and tightly winding the adhesive tape around the fixing point as illustrated, it is possible to further improve waterproof performance. Specifically, by the adhesive tape being wound from an end portion in the extending direction D1 of the wiring facing portion 66 to a portion where the wiring W is exposed from the wiring facing portion 66 in the extending direction D1, waterproof performance can be favorably secured.

Figure 12:
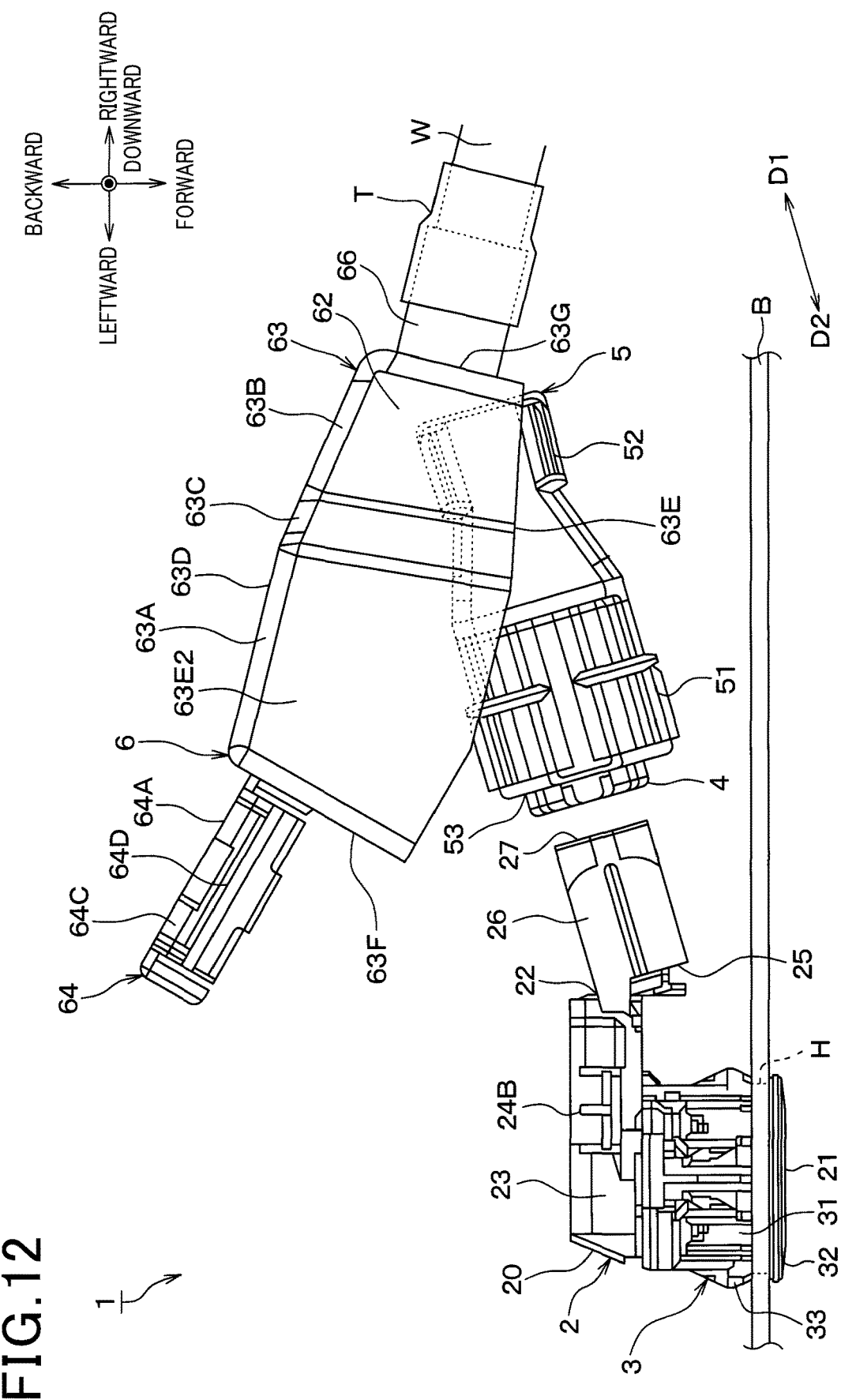
FIG. 12 is a bottom view illustrating an on-vehicle device according to a second embodiment in an exploded state.
Figure 13:
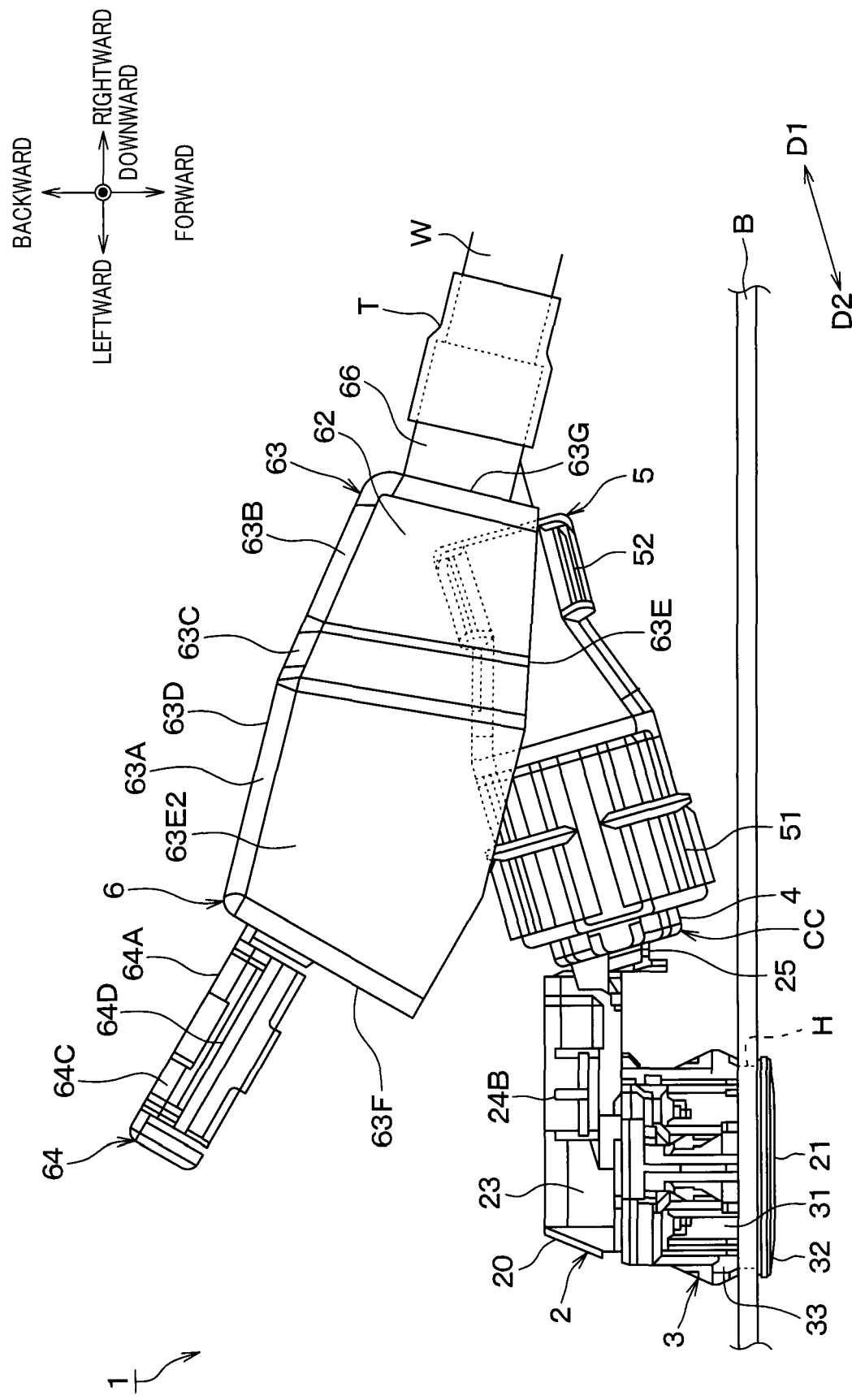
FIG. 13 is a bottom view of the on-vehicle device according to the second embodiment in a state where a protective cover is open.
Figure 14:
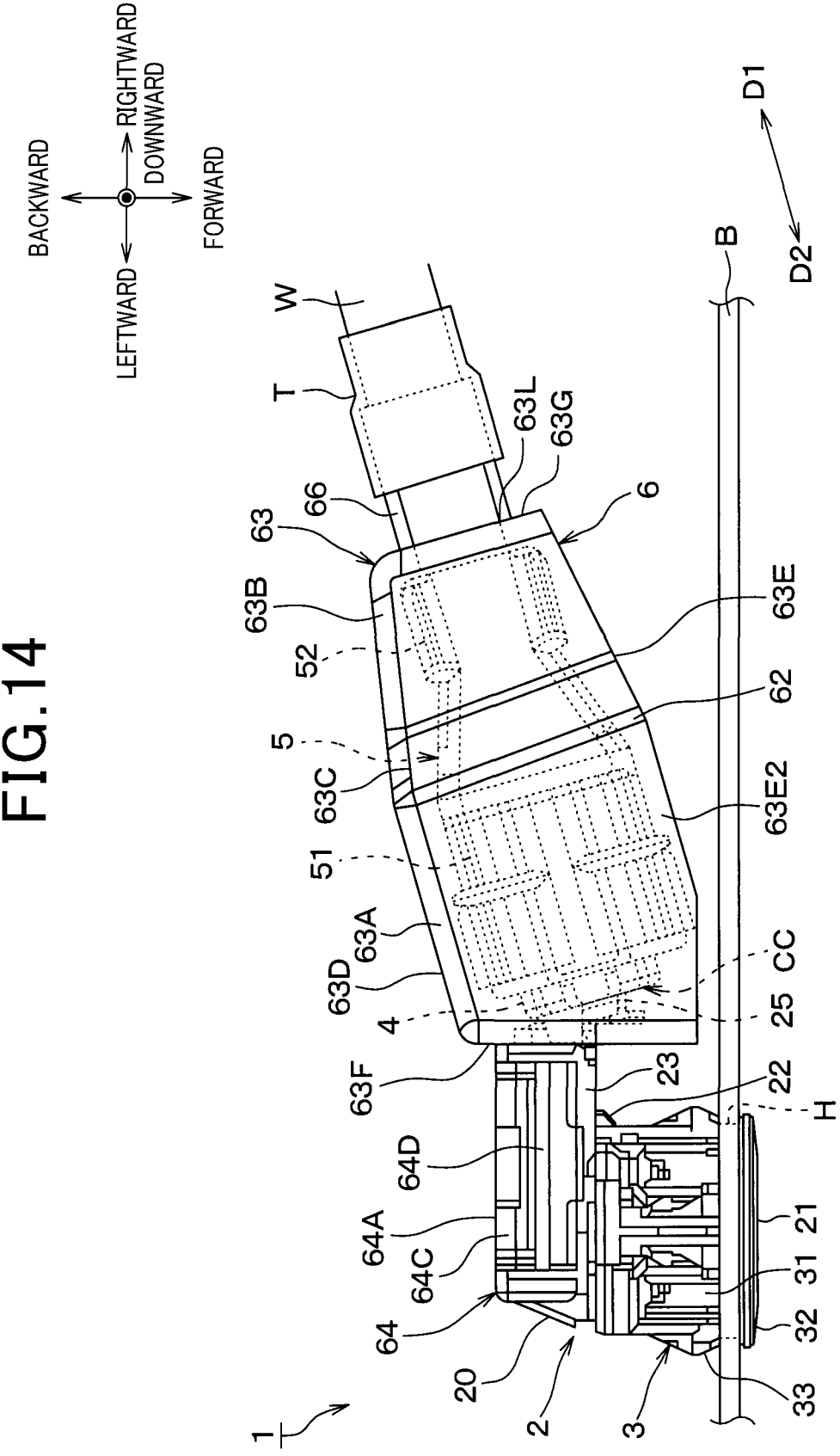
FIG. 14 is a bottom view of a schematic configuration of the on-vehicle device according to the second embodiment in an on-vehicle state.
Figure 15:
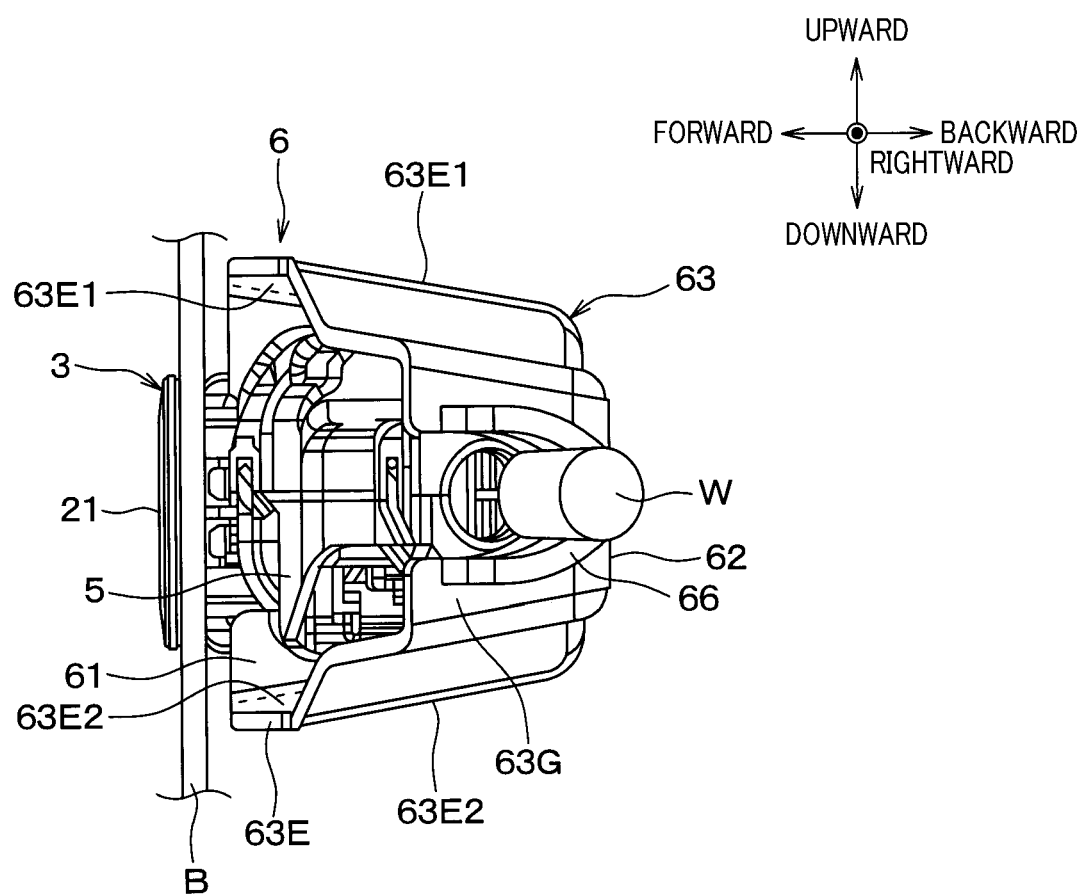
FIG. 15 is a side view of the on-vehicle device illustrated in FIG. 14.
Figure 16:
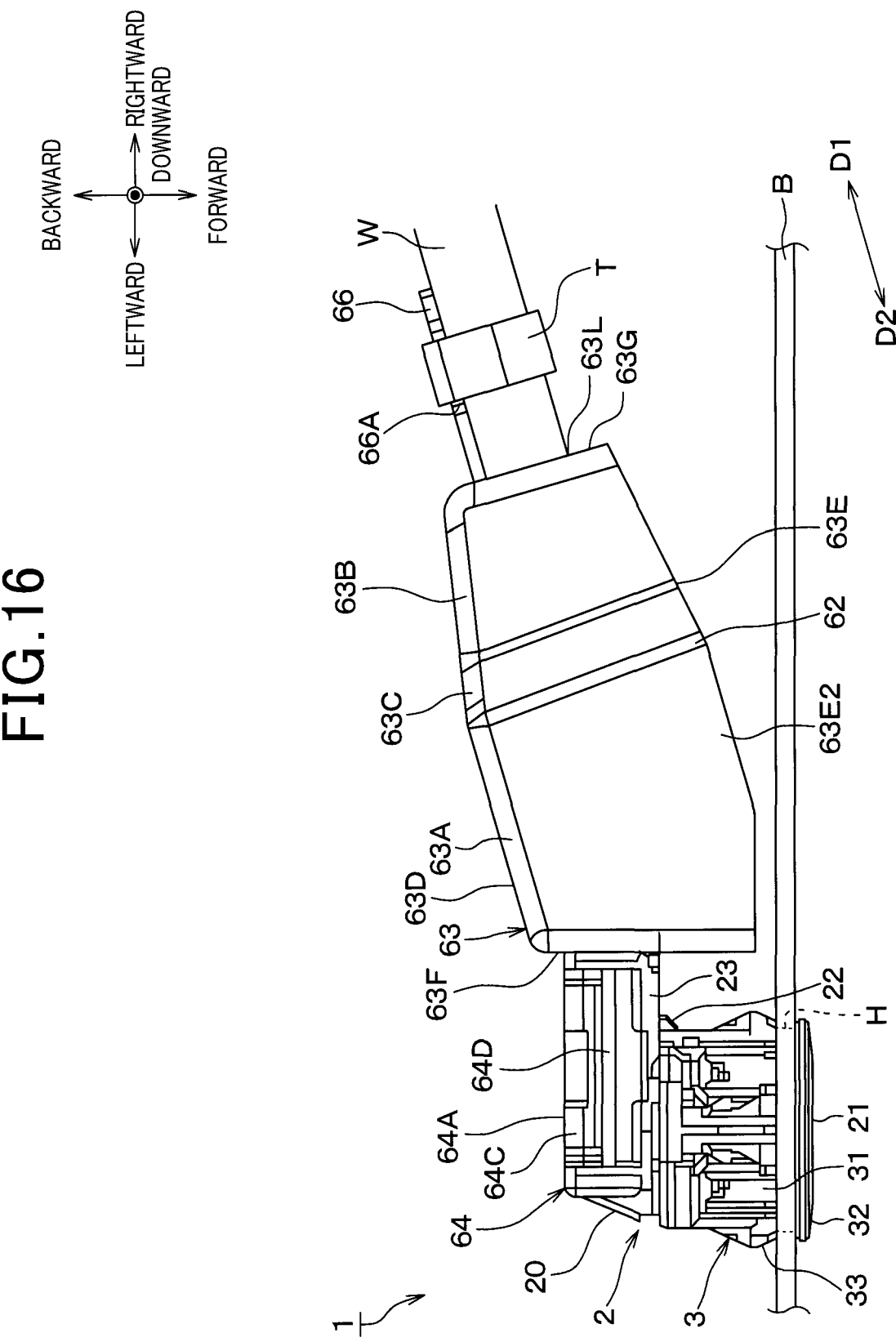
FIG. 16 is a bottom view illustrating a schematic configuration of an on-vehicle device according to a third embodiment in an on-vehicle state.
Figure 17:
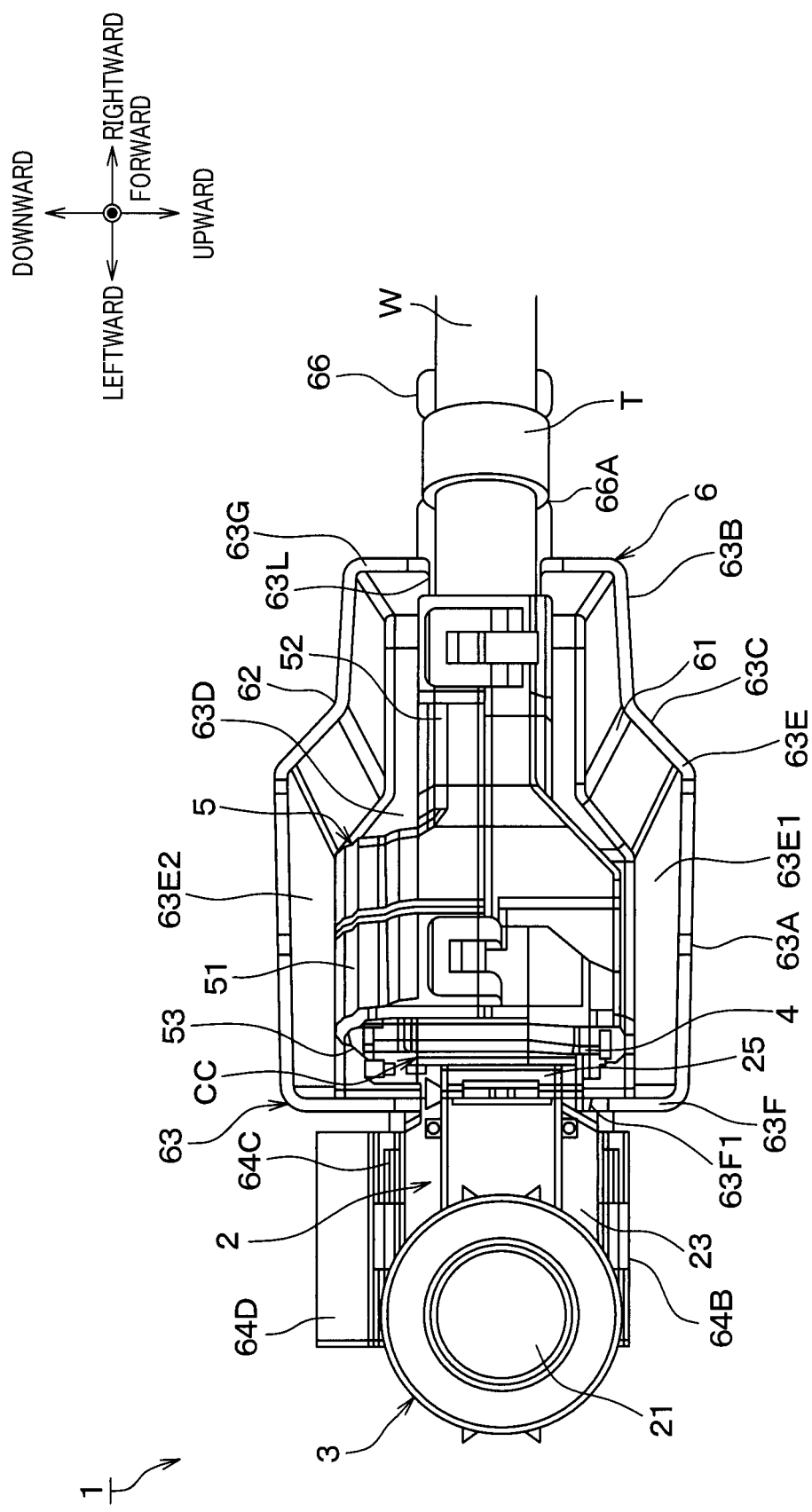
FIG. 17 is a front view of the on-vehicle device illustrated in FIG. 16.
Figure 18:
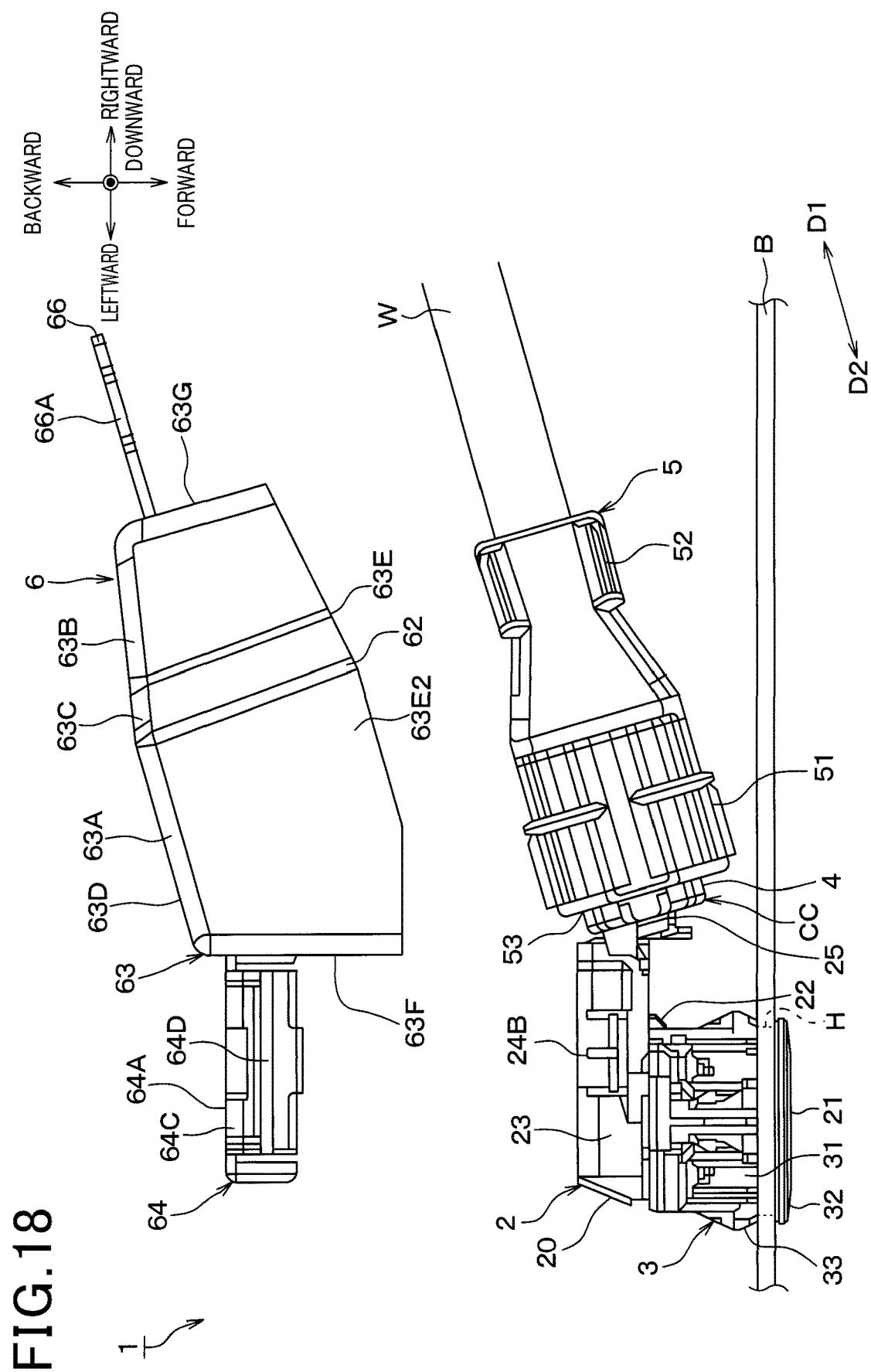
FIG. 18 is an exploded bottom view of the on-vehicle device illustrated in FIG. 16.
Figure 19:
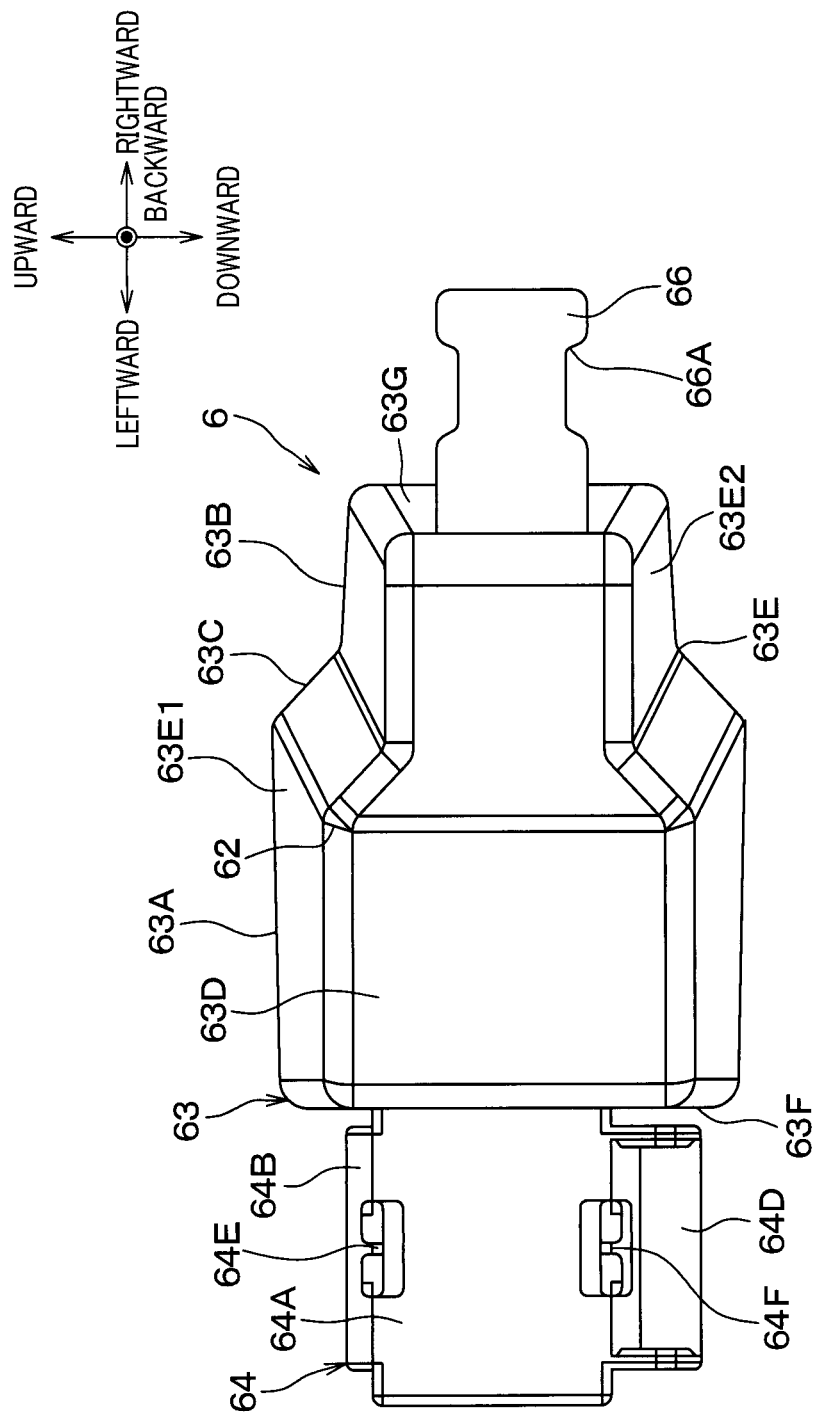
FIG. 19 is a rear view of a protective cover illustrated in FIG. 16 to FIG. 18.

Further, as illustrated in FIG. 12 to FIG. 14, the on-vehicle sensor 2 can be attached to and removed from the wiring-side connector 4 in a state where the wiring-side connector 4, the inner cover 5, and the protective cover 6 are mounted on the distal end portion of the wiring W. It is therefore possible to deliver the wiring-side connector 4, the inner cover 5, and the protective cover 6 which are mounted on the distal end portion of the wiring W to an assembly line. It is therefore possible to reduce load on inventory management and component storage space in the assembly line.

Third Embodiment

The on-vehicle device 1 and the protective cover 6 according to a third embodiment will be described with reference to FIG. 16 to FIG. 19. In the present embodiment, a shape of the wiring facing portion 66 in the above-described second embodiment is changed to a flat plate shape.

In other words, in the present embodiment, the wiring facing portion 66, which is a flat plate portion provided along the distal end portion of the wiring W in the fixed state, extends in the extending direction D1 from the distal wall portion 63G of the protection portion 63. The wiring facing portion 66 has a sheet thickness direction along the sheet thickness direction of the rear wall portion 63D of the protection portion 63. Further, the wiring facing portion 66 has a sheet width direction parallel to the sensor width direction.

The wiring facing portion 66 includes wound portions 66A. The wound portions 66A, which are recesses for facilitating winding of the tie T, are provided at both end portions in the sheet width direction.

According to such a configuration, the protective cover 6 is fixed at two points on the on-vehicle sensor 2 side and on the wiring W side. By this means, the protective cover 6 is more reliably fixed and held on the vehicle body component B side. Further, load on the on-vehicle sensor 2 side due to weight of the protective cover 6 is reduced. Further, in a case where the wiring W is flexible, by utilizing the flexibility, the protection portion 63 can be made slidable relatively with respect to the connector coupling portion CC around a point at which the wiring facing portion 66 is fixed at the wiring W.

Fourth Embodiment

Figure 20:
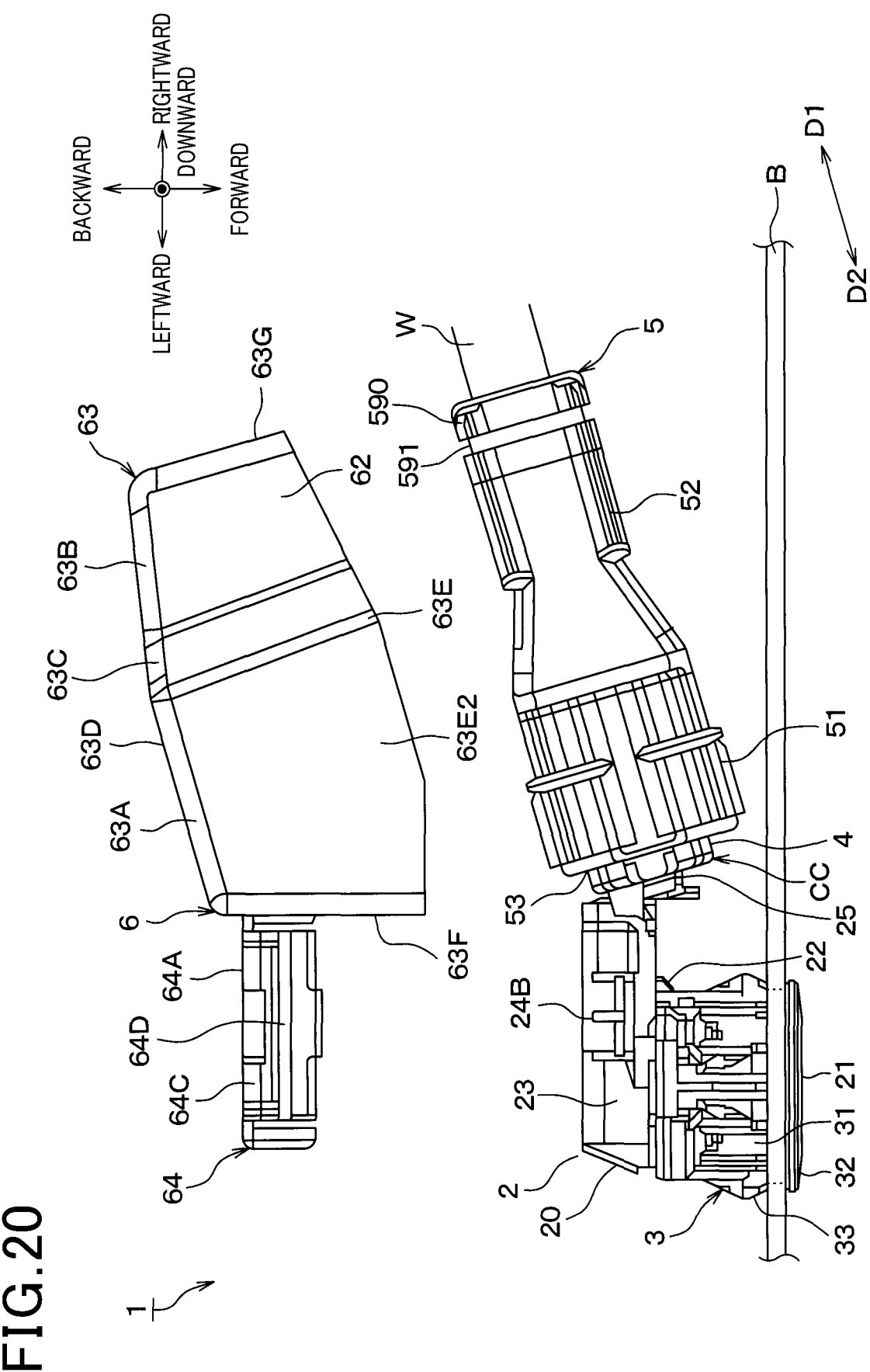
FIG. 20 is a bottom view of an on-vehicle device according to a fourth embodiment in an exploded state.

The on-vehicle device 1 and the protective cover 6 according to a fourth embodiment will be described with reference to FIG. 20. In the present embodiment, at least part of the effects of the above-described second embodiment and third embodiment are achieved with a simpler configuration.

Specifically, in the present embodiment, the wiring facing portion 66 and the tie T in the above-described second embodiment and third embodiment are omitted. Meanwhile, in the present embodiment, a cover locking portion 590 is mounted on the wiring W. The cover locking portion 590 is formed with a synthetic resin and is provided so as to enclose a circumference of the wiring W. The cover locking portion 590 is disposed to be adjacent to the wiring protection portion 52 in the inner cover 5 along the extending direction D1.

The cover locking portion 590 includes a locking groove 591. The locking groove 591 is provided to engage with the cutout portion 63L at the distal wall portion 63G. Specifically, the locking groove 591 is formed so as to tightly adhere to the cutout portion 63L and a portion near the cutout portion 63L at the distal wall portion 63G.

According to such a configuration, the protective cover 6 is more reliably fixed and held on the vehicle body component B side. Further, load on the on-vehicle sensor 2 side due to weight of the protective cover 6 is reduced. Further, the locking groove 591 tightly adheres to the cutout portion 63L and the portion near the cutout portion 63L at the distal wall portion 63G, so that it is possible to favorably secure waterproof performance and dust resistance. Still further, by forming the cover locking portion 590 with a soft material such as silicone rubber, the protective cover 6 can be made relatively slidable around a portion at which the cover locking portion 590 is fixed at the distal wall portion 63G.

Note that the cover locking portion 590 may be integrated with the wiring protection portion 52 at the inner cover 5. In other words, the cover locking portion 590 may be seamlessly integrally formed with the wiring protection portion 52 as part of the inner cover 5. In other words, the cover locking portion 590 may be an end portion in the extending direction D1 of the wiring protection portion 52. In this case, the whole of the inner cover 5 including the cover locking portion 590 can be formed with a soft material such as silicone rubber.

Fifth Embodiment

Figure 21:
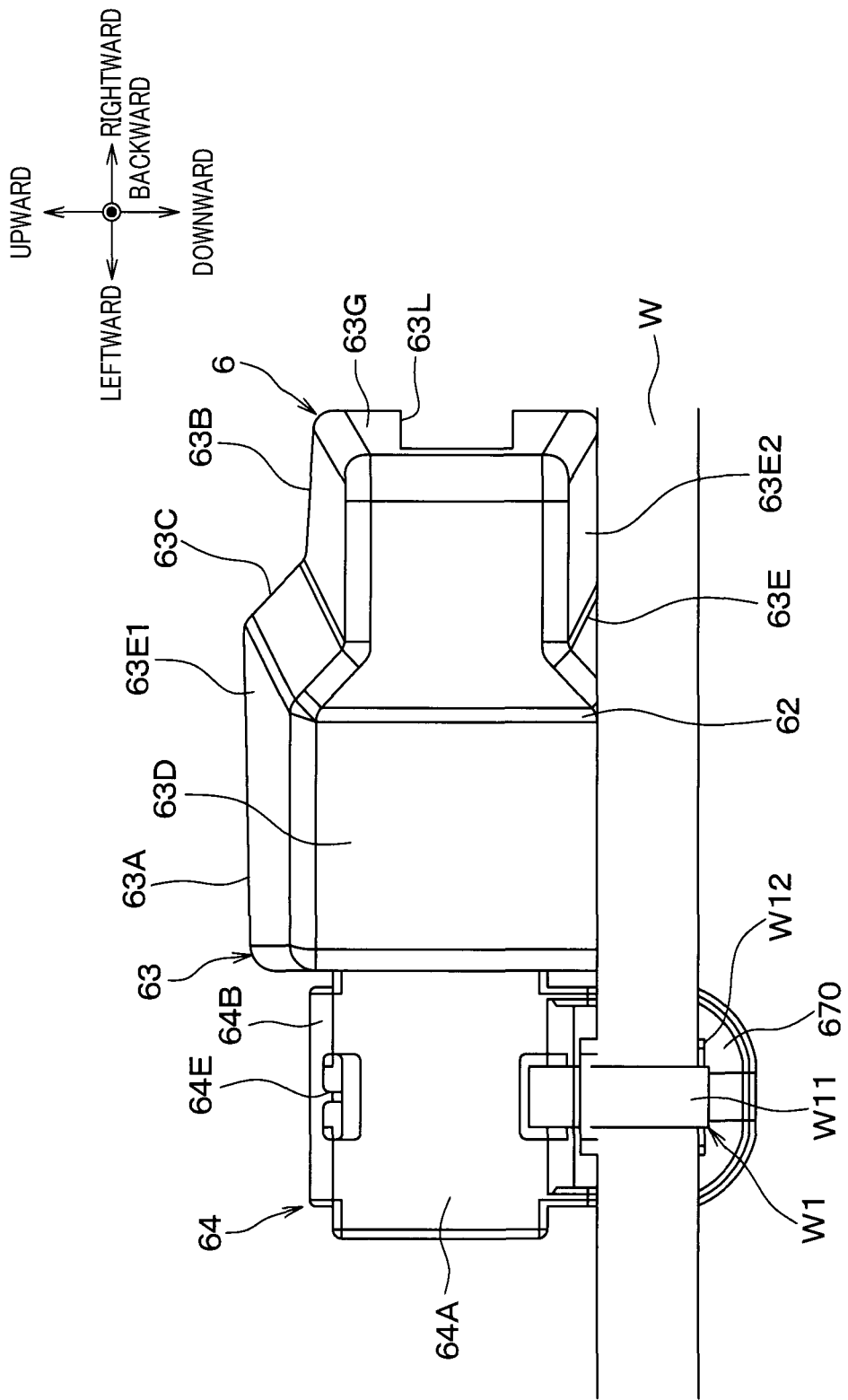
FIG. 21 is a rear view illustrating a schematic configuration of a protective cover according to a fifth embodiment along with a wiring.
Figure 22:
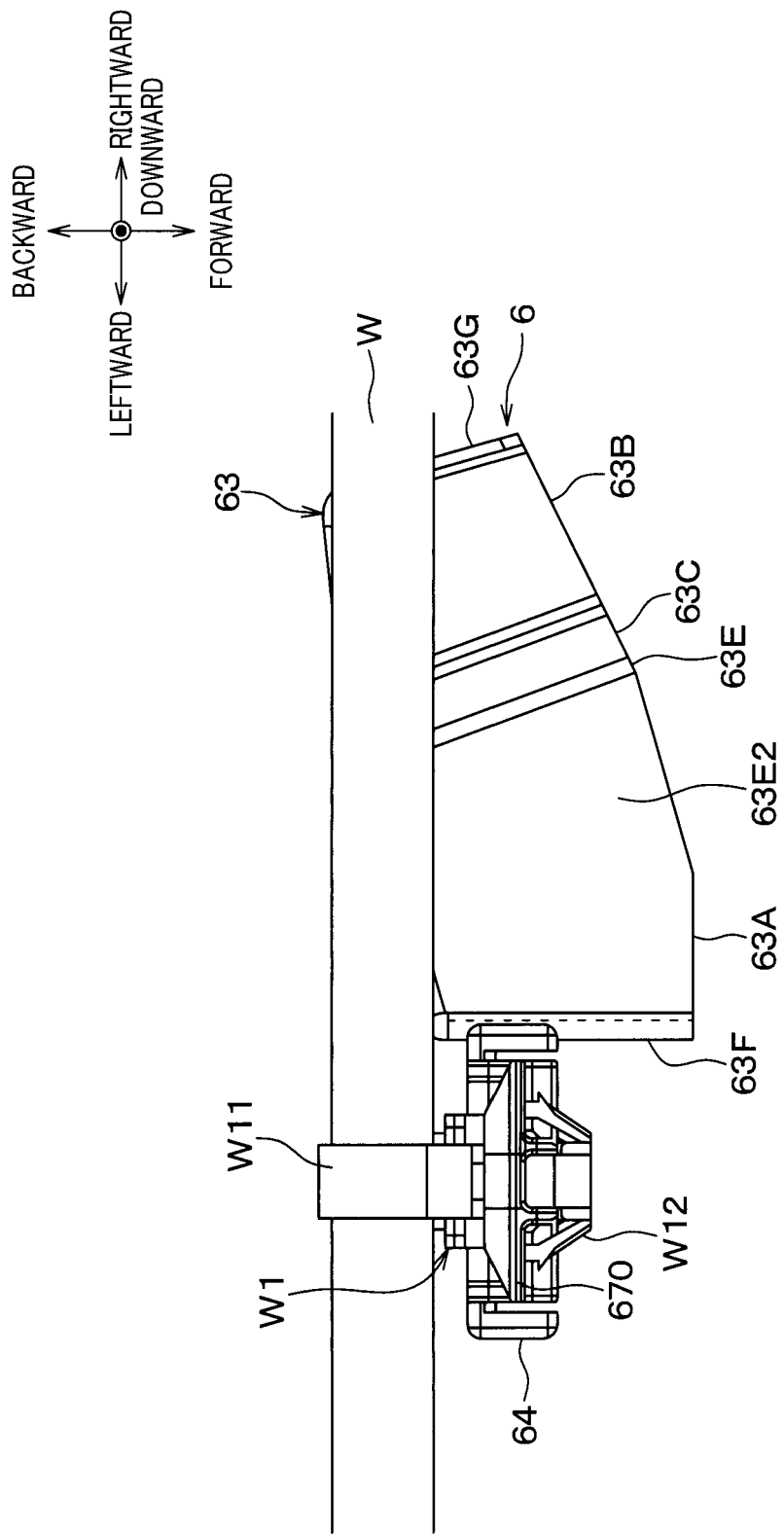
FIG. 22 is a bottom view of a schematic configuration of the protective cover according to the fifth embodiment along with the wiring.
Figure 23:
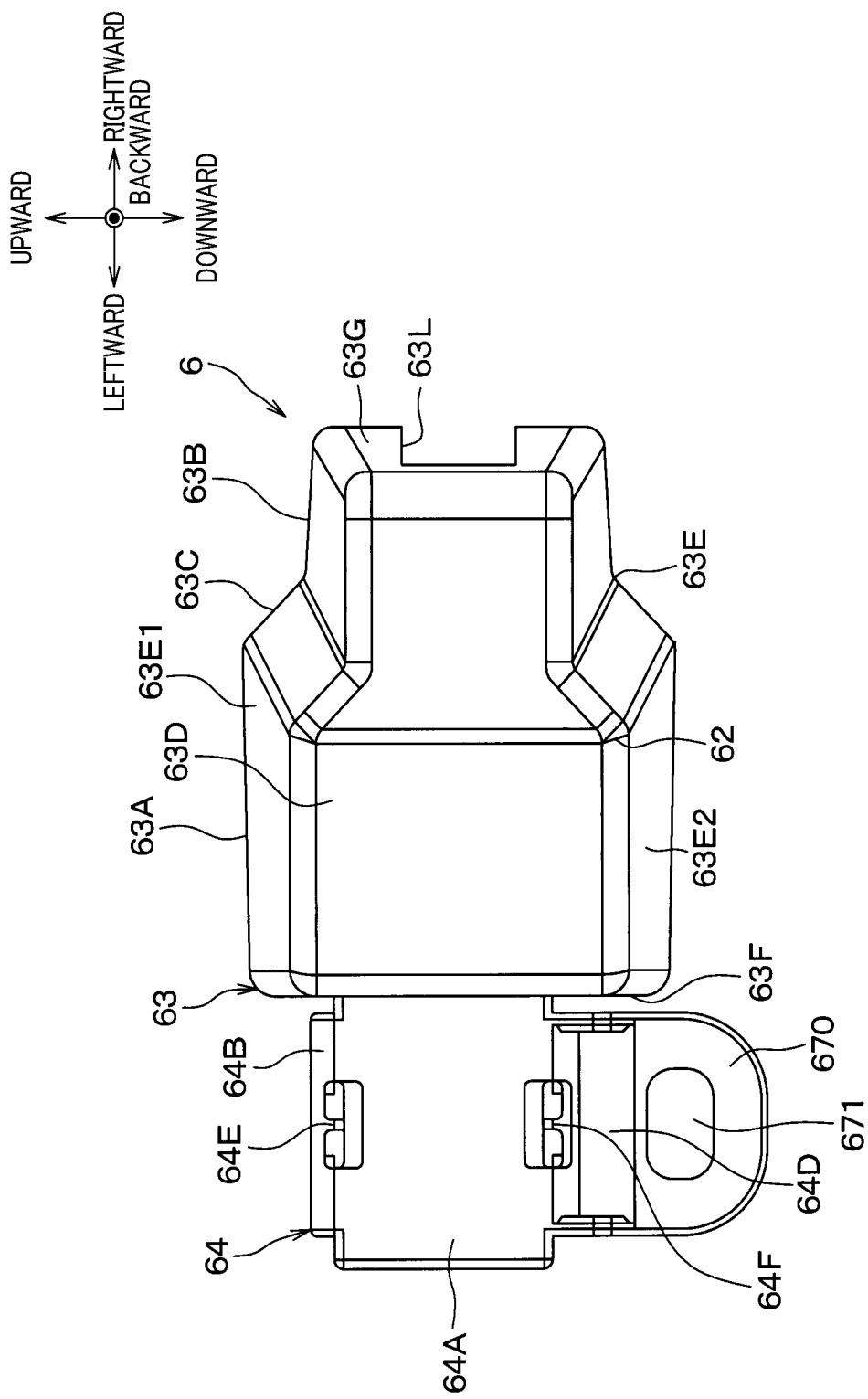
FIG. 23 is a rear view of the protective cover illustrated in FIG. 21 and FIG. 22.
Figure 24:
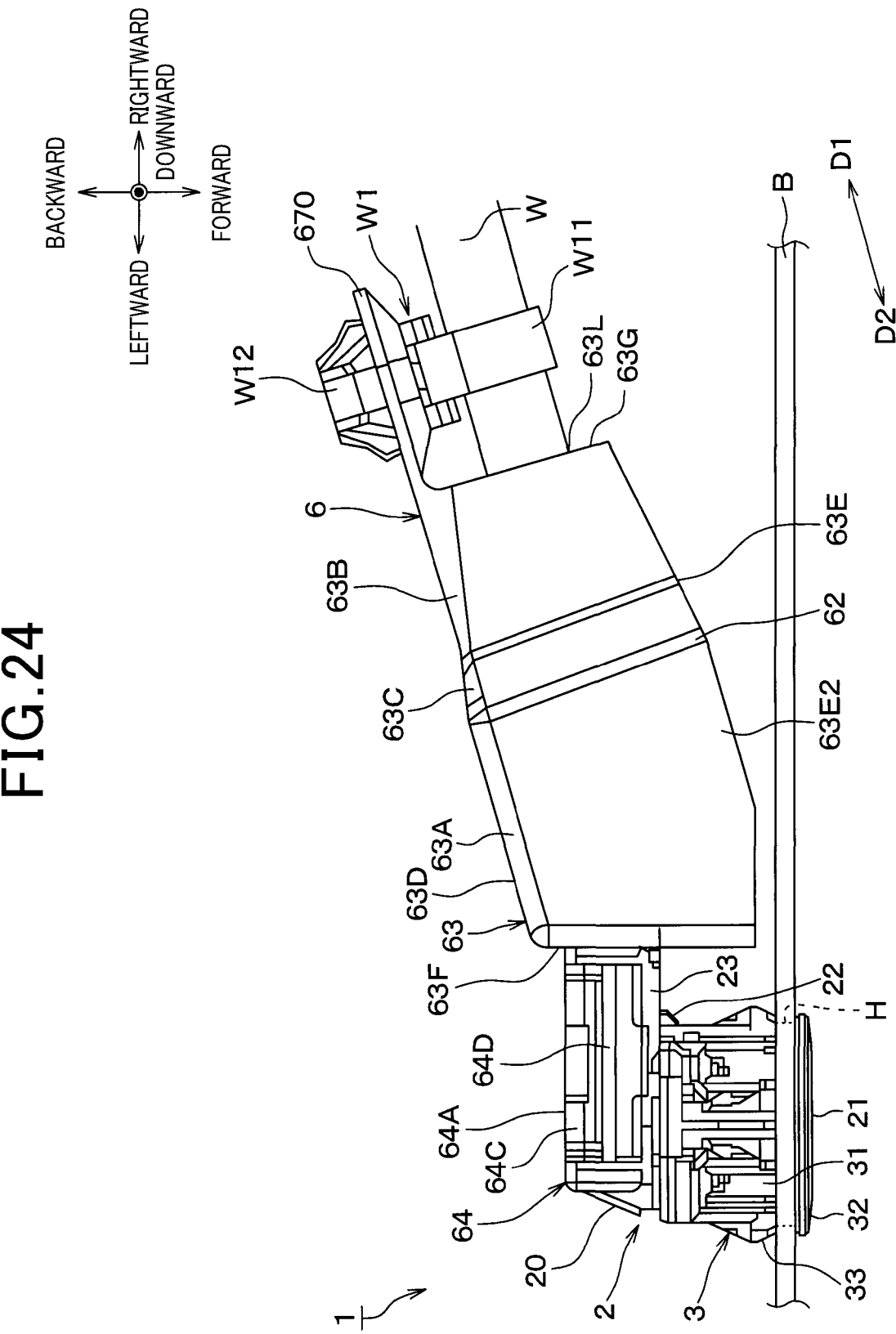
FIG. 24 is a bottom view of a schematic configuration of an on-vehicle device according to a sixth embodiment in an on-vehicle state.
Figure 25:
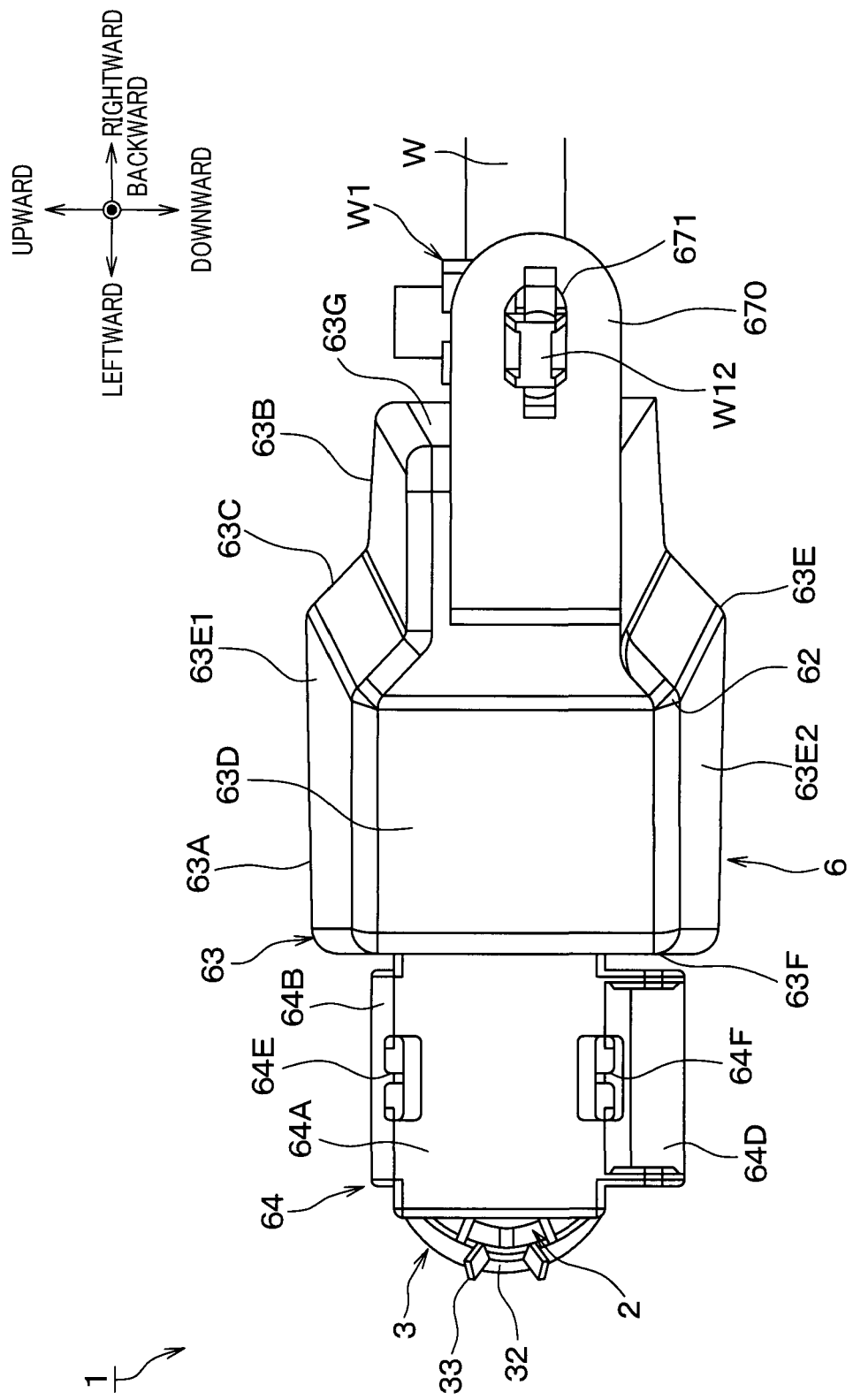
FIG. 25 is a rear view of the on-vehicle device illustrated in FIG. 24.
Figure 26:
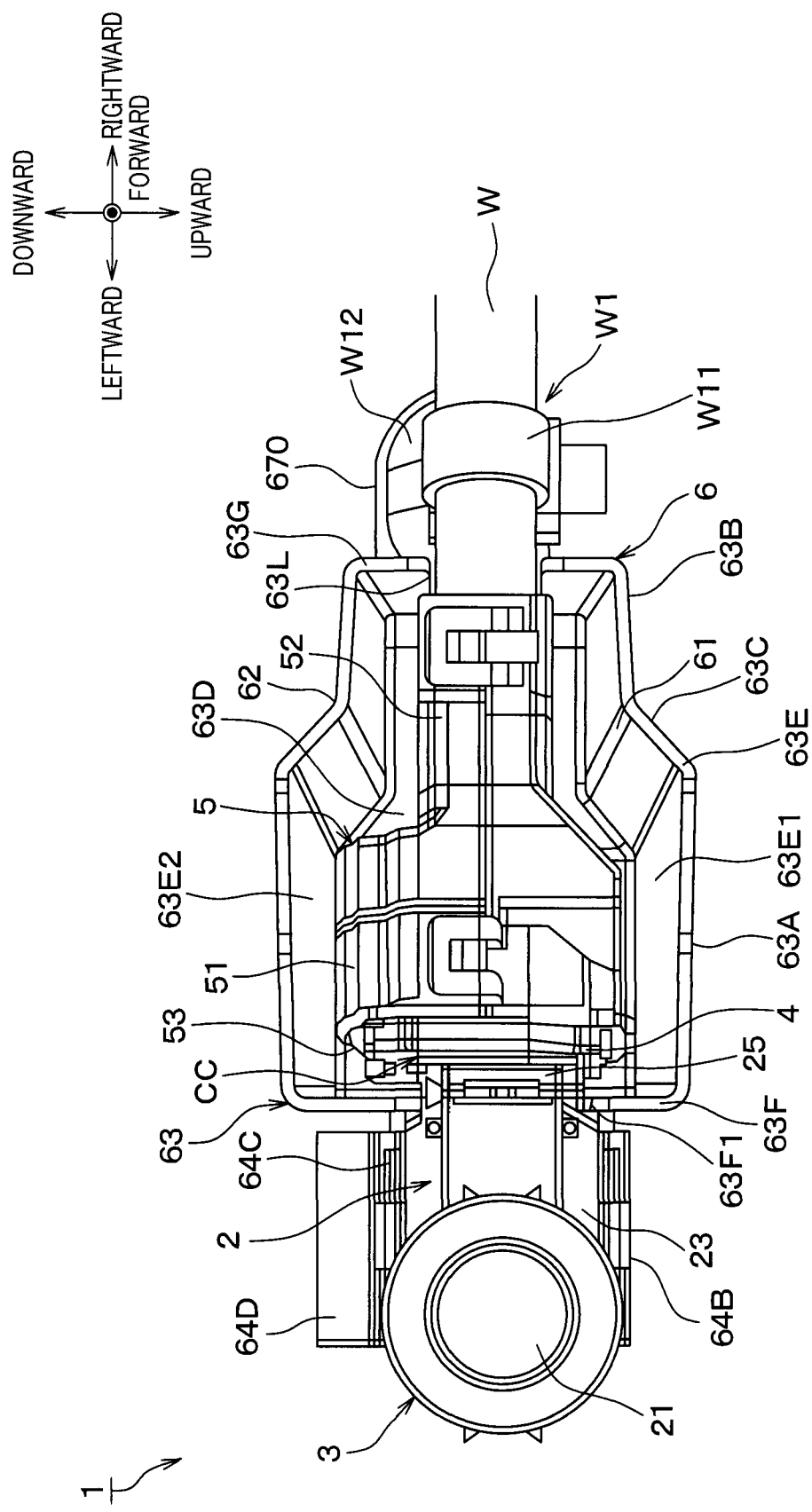
FIG. 26 is a front view of the on-vehicle device illustrated in FIG. 24.
Figure 27:
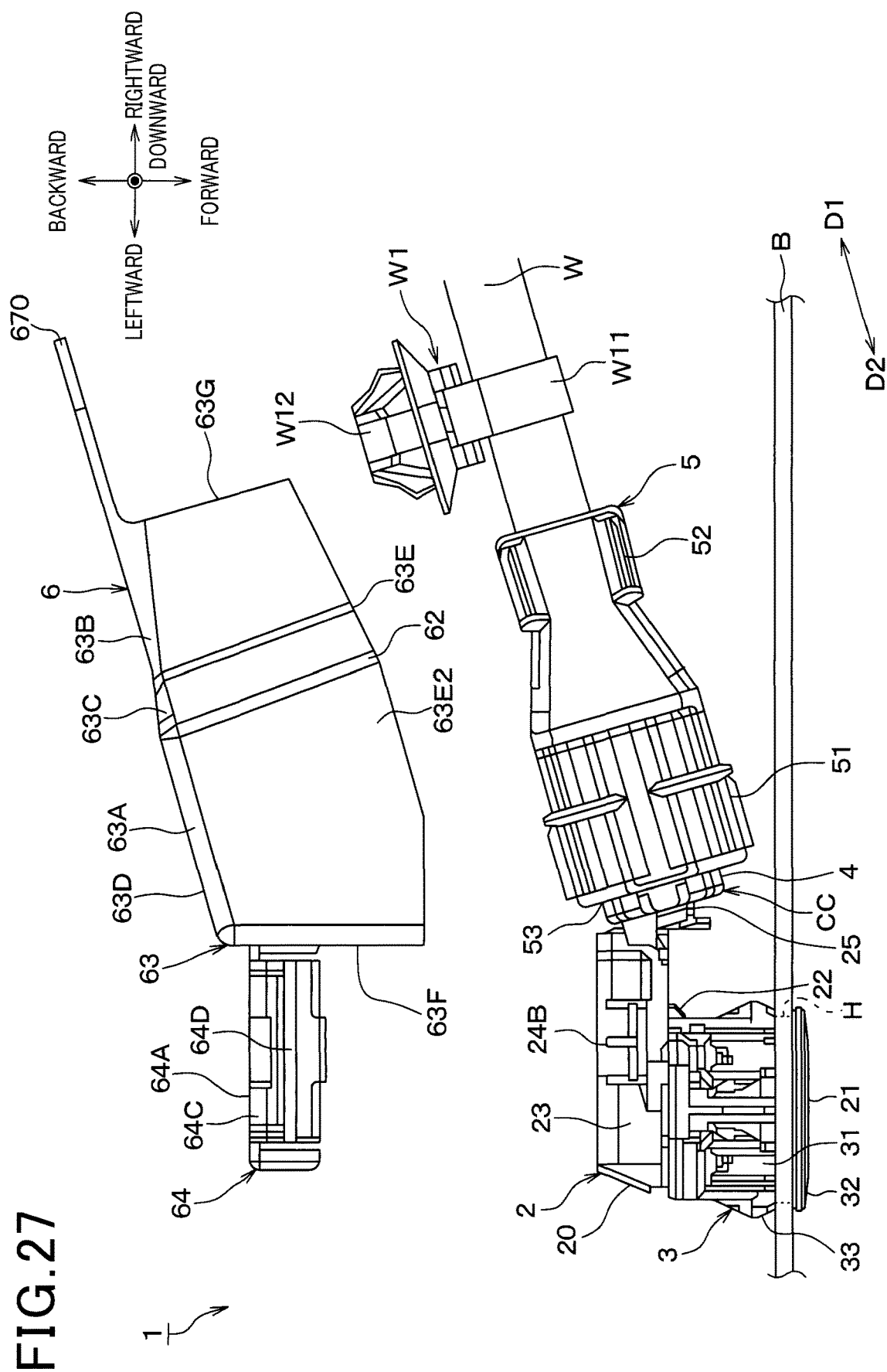
FIG. 27 is an exploded bottom view of the on-vehicle device illustrated in FIG. 24.
Figure 28:
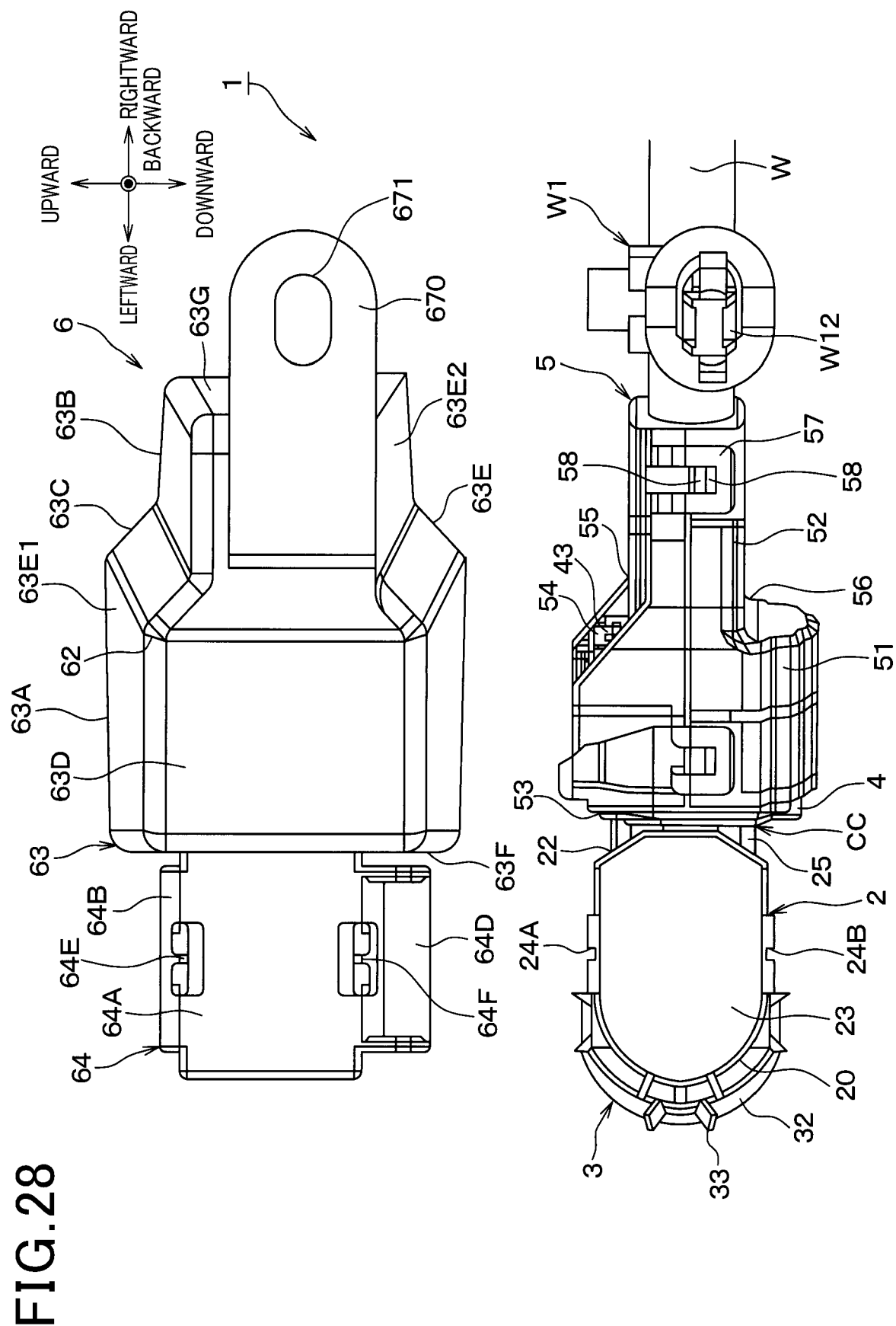
FIG. 28 is an exploded rear view of the on-vehicle device illustrated in FIG. 25.
Figure 29:
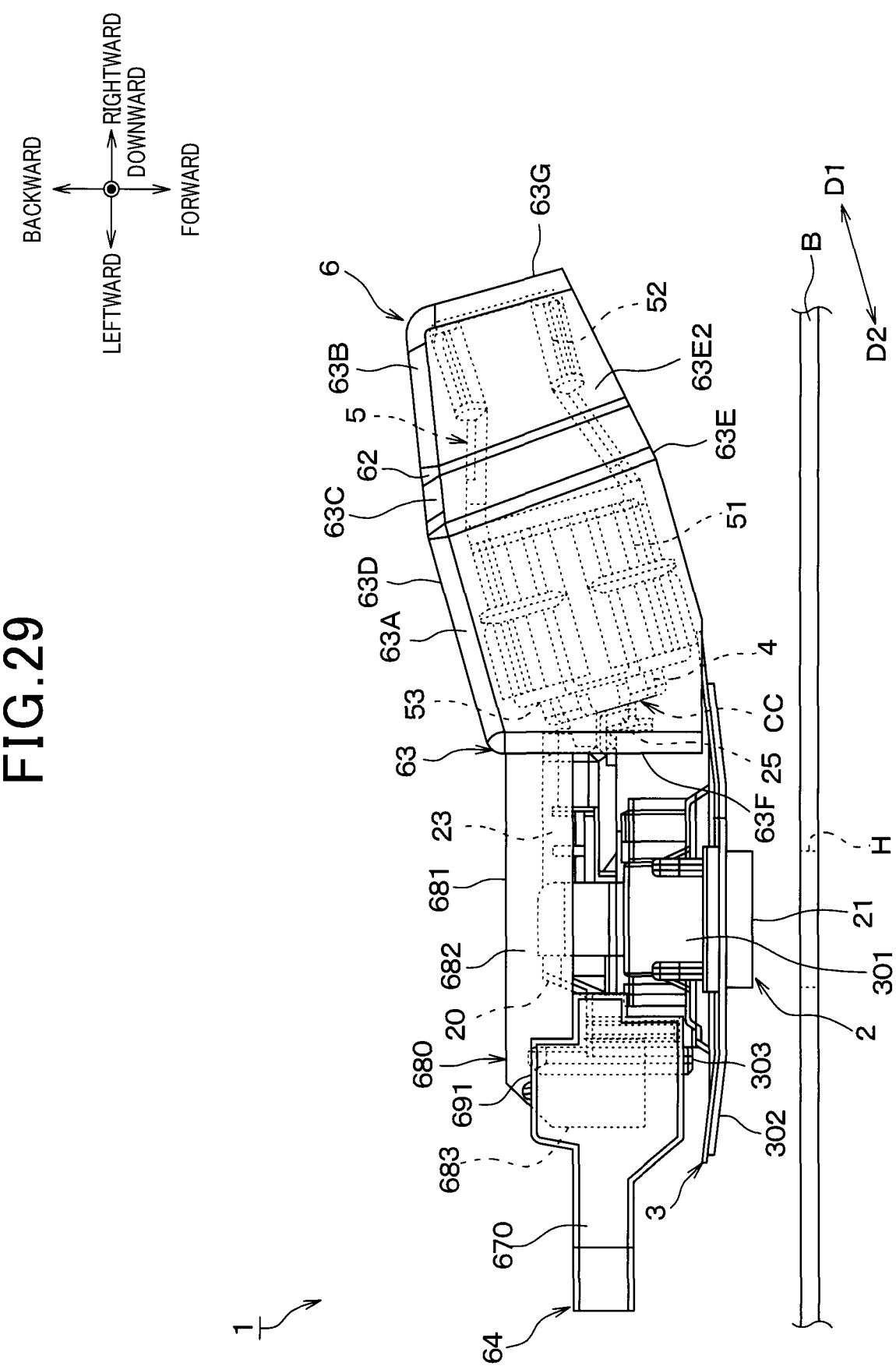
FIG. 29 is a bottom view illustrating a schematic configuration of an on-vehicle device according to a seventh embodiment.
Figure 30:
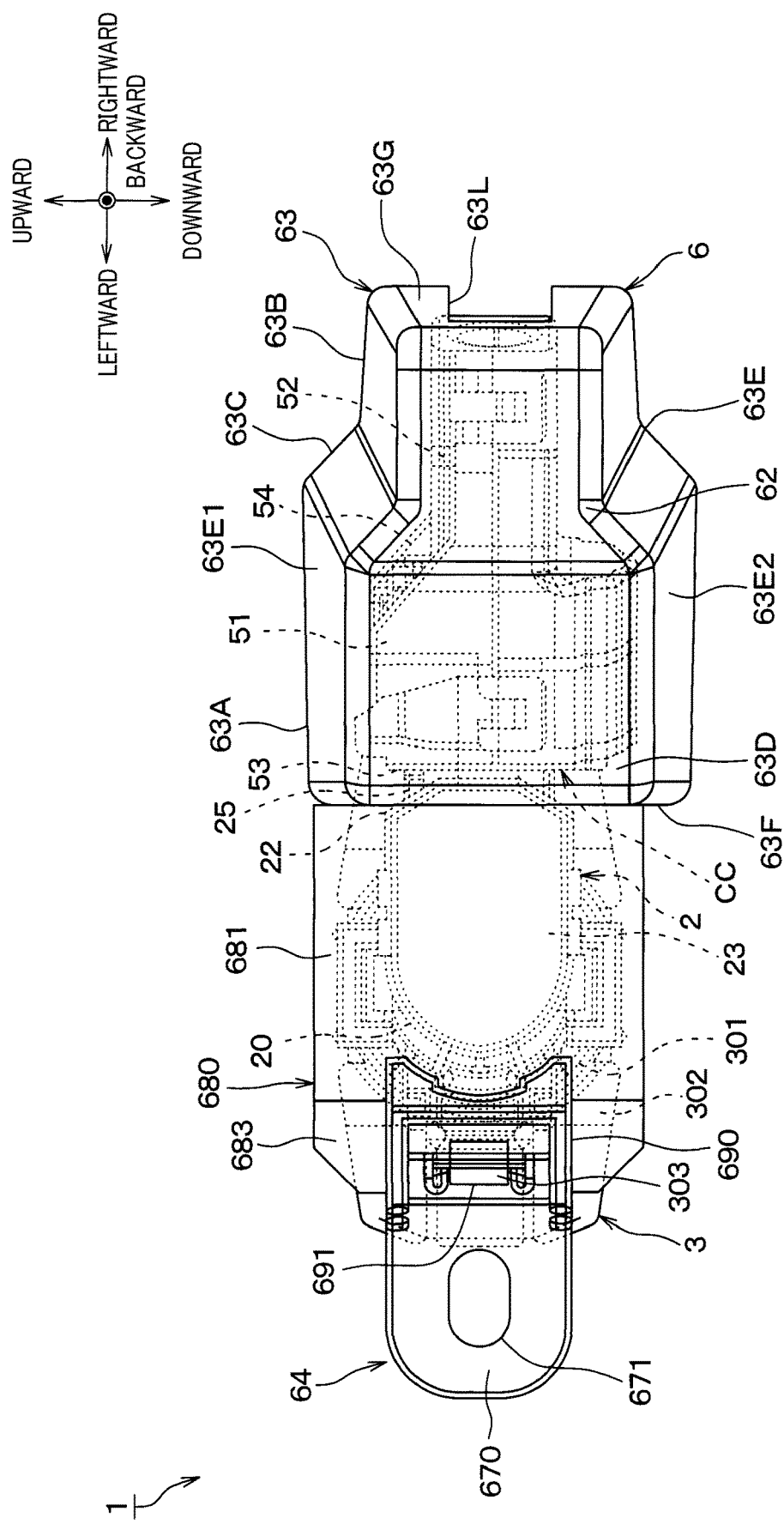
FIG. 30 is a rear view of the on-vehicle device illustrated in FIG. 29.
Figure 31:
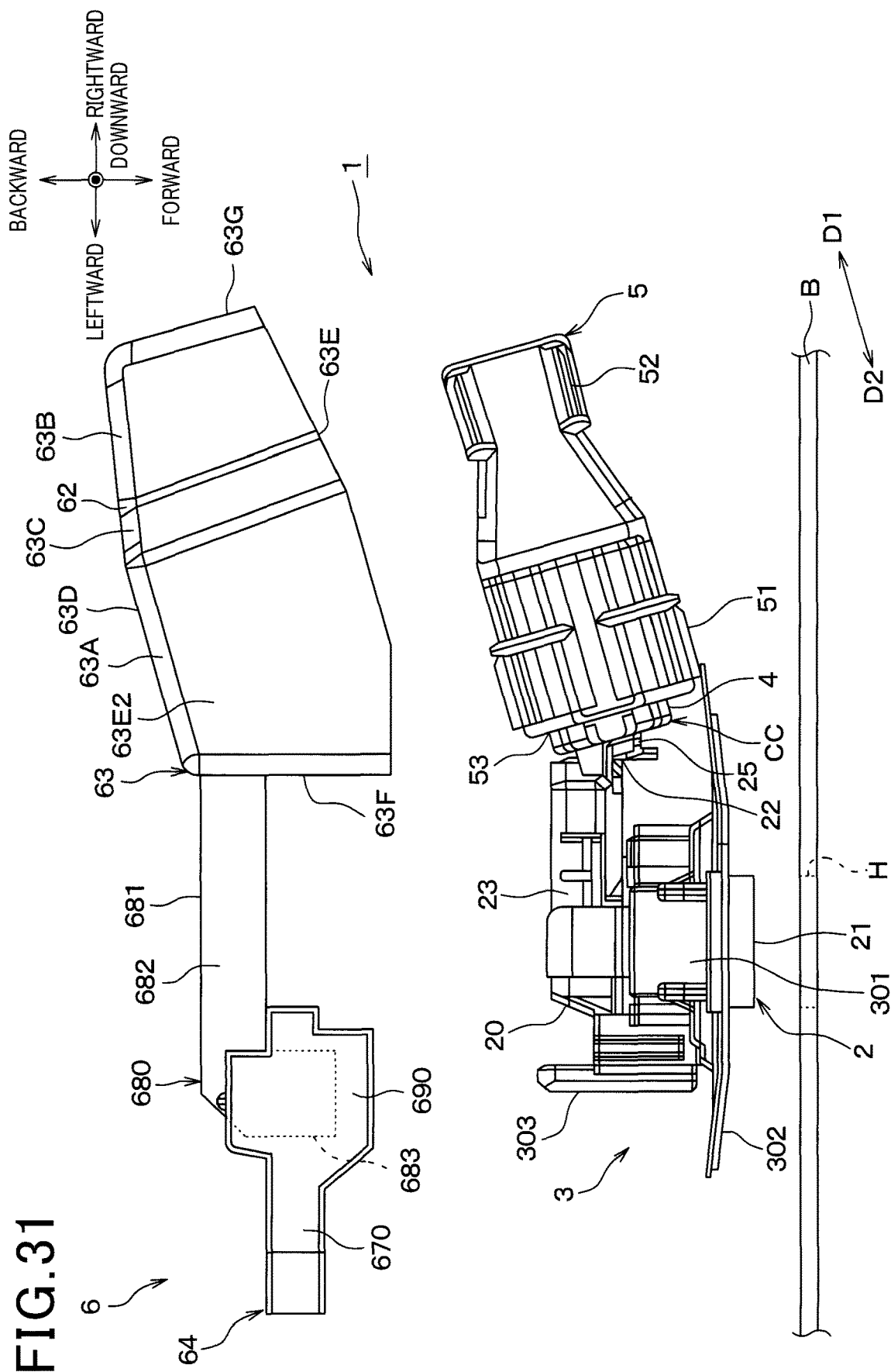
FIG. 31 is an exploded bottom view of the on-vehicle device illustrated in FIG. 29.
Figure 32:
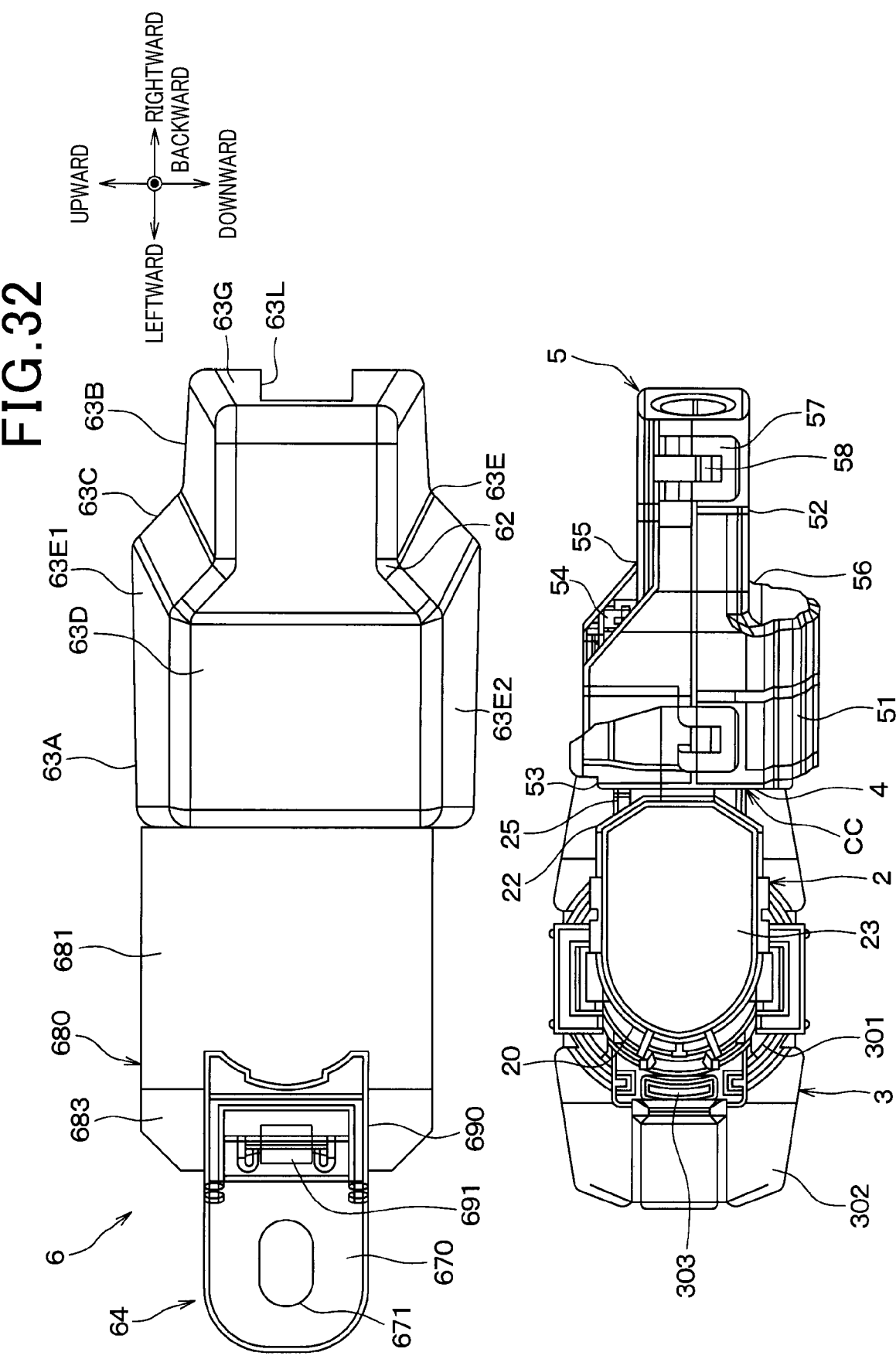
FIG. 32 is an exploded rear view of the on-vehicle device illustrated in FIG. 30.

The protective cover 6 according to a fifth embodiment will be described with reference to FIG. 21 to FIG. 23. In the present embodiment, a function of supporting the wiring W is provided to the protective cover 6 in the above-described first embodiment. Note that the wiring W supported by the protective cover 6 according to the present embodiment, illustrated in FIG. 21 to FIG. 23 is different from the wiring W illustrated in FIG. 1, or the like. In other words, the wiring W illustrated in FIG. 21 to FIG. 23 is a trunk wiring. In contrast, the wiring W projecting along the extending direction D1 from the cutout portion 63L at the protective cover 6 in the fixed state, illustrated in FIG. 1, or the like, is a branch wiring. The branch wiring illustrated in FIG. 1, or the like, branches from the trunk wiring illustrated in FIG. 21 to FIG. 23 and is not illustrated in FIG. 21 to FIG. 23.

The protective cover 6 includes a wiring support portion 670 which supports the wiring W. In the present embodiment, the wiring support portion 670 is provided at the fixing portion 64. Specifically, the wiring support portion 670 is formed as a plate-like portion which is seamlessly integrated with the tongue piece portion 64D. In other words, the wiring support portion 670 has a sheet thickness direction parallel to the mounting direction and is formed by extending the tongue piece portion 64D in the sensor width direction.

The wiring support portion 670 includes a fixture insertion hole 671. The fixture insertion hole 671, which is a through-hole which passes through the wiring support portion 670 along the sheet thickness direction of the wiring support portion 670, is formed so as to be able to fix a wiring fixture W1. The wiring fixture W1 includes a ring portion W11 and a linking portion W12. The ring portion W11 is provided to enclose a circumference of the wiring W. The linking portion W12 projects from the ring portion W11 so as to engage with the wiring support portion 670 by being inserted into the fixture insertion hole 671.

In such a configuration, the fixing portion 64 has a function of supporting the wiring W in addition to a function of fixing the protective cover 6 on the on-vehicle sensor 2 side. In other words, a structure portion which supports the trunk wiring and a structure portion which fixes the protective cover 6 on the on-vehicle sensor 2 side are integrated.

Thus, according to such a configuration, it is possible to provide a function of supporting the wiring W to the protective cover 6 with a simple configuration.

Sixth Embodiment

The on-vehicle device 1 and the protective cover 6 according to a sixth embodiment will be described with reference to FIG. 24 to FIG. 28. In the present embodiment, the above-described fifth embodiment is modified so that the wiring support portion 670 is provided at the protection portion 63 in place of the fixing portion 64. Note that the wiring W illustrated in FIG. 24 to FIG. 28 is the same branch wiring as the wiring W illustrated in FIG. 1, or the like, and is different from the trunk wiring illustrated in FIG. 21 to FIG. 23.

In the present embodiment, the wiring support portion 670 further extends in the extending direction D1 from an end portion in the extending direction D1 of the protective cover 6 so as to be continuous with the rear wall portion 63D. The wiring support portion 670 has a sheet thickness direction in a direction orthogonal to both the sensor width direction and the extending direction D1. The fixture insertion hole 671 is provided at the wiring support portion 670. The fixture insertion hole 671, which is a through-hole which passes through the wiring support portion 670 along the sheet thickness direction of the wiring support portion 670, is formed so as to be able to fix the wiring fixture W1. The wiring fixture W1 has a configuration similar to the configuration in the above-described fourth embodiment.

In such a configuration, the protective cover 6 is fixed at two points on the on-vehicle sensor 2 side and on the wiring W side. By this means, the protective cover 6 is more reliably fixed and held on the vehicle body component B side. Further, load on the on-vehicle sensor 2 side due to weight of the protective cover 6 is reduced. Further, the wiring-side connector 4, the inner cover 5 and the protective cover 6 which are mounted on the distal end portion of the wiring W can be delivered to an assembly line. Thus, load of inventory management and component storage space in the assembly line is reduced.

Seventh Embodiment

The on-vehicle device 1 and the protective cover 6 according to a seventh embodiment will be described with reference to FIG. 29 to FIG. 32. In the above-described first to sixth embodiments, the on-vehicle sensor 2 is a so-called bezel type ultrasonic sensor. In contrast, in the present embodiment, the on-vehicle sensor 2 is a so-called bezel-less type or retainer type ultrasonic sensor. In other words, the present embodiment indicates that the present disclosure can be favorably applied to either a bezel type or a bezel-less type.

In the present embodiment, the accessory component 3, which is a circular body called retainer, is formed with a synthetic resin, for example, a rigid synthetic resin such as polyacetal. The accessory component 3 is attachable to the inner surface of the vehicle body component B with an adhesive such as a double-stick tape.

Specifically, the accessory component 3 according to the present embodiment includes a retainer body 301, a vehicle body facing portion 302, and an engagement piece 303. The retainer body 301, the vehicle body facing portion 302 and the engagement piece 303 are seamlessly integrally formed with the same material.

The retainer body 301 is formed in a substantially cylindrical shape so as to expose a tip portion in the ultrasonic wave transmission direction of the cylindrical portion 21 of the on-vehicle sensor 2 and store a base end portion adjacent to the box portion 23. The vehicle body facing portion 302, which is a portion to be attached to the inner surface of the vehicle body component B, is formed in a sheet shape. The vehicle body facing portion 302 extends outward along a retainer radial direction from a tip portion of the retainer body 301, that is, one end portion along a central axis line in the substantially cylindrical shape. The "retainer radial direction" is a direction extending in a radial manner from the central axis line in the substantially cylindrical shape of the retainer body 301. A plurality of vehicle body facing portions 302 are provided. In other words, a plurality of vehicle body facing portions 302 extend in a radial manner, that is, in a petal shape.

The engagement piece 303, which is a portion at which the protective cover 6 is fixed, is provided on an outer side of the retainer body 301 in the retainer radial direction. The engagement piece 303 extends along the central axis line in the substantially cylindrical shape of the retainer body 301 from the tip portion of the retainer body 301. The engagement piece 303 is formed in a tongue piece shape having a sheet thickness direction along the sensor longitudinal direction, a longitudinal direction along the mounting direction, and a sheet width direction along the sensor width direction.

In the present embodiment, the fixing portion 64 is fixed at a sensor shielding portion 680 extending in the sensor longitudinal direction from the protection portion 63. In other words, the protection portion 63 and the sensor shielding portion 680 are seamlessly integrally formed with the same material. In contrast, the fixing portion 64 is linked to the protection portion 63 via the sensor shielding portion 680 by being formed separately from the protection portion 63 and the sensor shielding portion 680 and then attached to the sensor shielding portion 680.

The sensor shielding portion 680 includes a first shielding portion 681, a second shielding portion 682, and a third shielding portion 683. The first shielding portion 681, which is a portion in a substantially flat plate shape having a sheet thickness direction in the mounting direction, projects in the coupling direction D2 along the sensor longitudinal direction from the proximal wall portion 63F of the protection portion 63. In other words, the first shielding portion 681 extends in the sensor longitudinal direction so as to face the box portion 23 at the chassis 20 of the on-vehicle sensor 2 in the fixed state.

The first shielding portion 681 is formed to face the vehicle body component B across the box portion 23 at the on-vehicle sensor 2 by being provided along the vehicle body component B in the on-vehicle state. In other words, the first shielding portion 681 is provided so as to shield the box portion 23 at the on-vehicle sensor 2 from inside of the vehicle body component B, that is, from behind in the drawing.

The second shielding portion 682, which is a portion in a substantially flat plate shape having a sheet thickness direction in the sensor width direction, is formed in a rectangular shape having a longitudinal direction in the sensor longitudinal direction. The second shielding portion 682 extends in the mounting direction from both end portions in the sensor width direction of the first shielding portion 681. In other words, a pair of second shielding portions 682 is disposed to face each other across the box portion 23. In other words, the pair of second shielding portions 682 is provided so as to shield the box portion 23 of the on-vehicle sensor 2 from both sides in the sensor width direction, that is, from above and below in the drawing.

The third shielding portion 683 extends along the mounting direction from tip portions of the first shielding portion 681 and the second shielding portion 682. The third shielding portion 683 is provided to shield the box portion 23 of the on-vehicle sensor 2 from one side in the sensor longitudinal direction, that is, from a left side in the drawing. The fixing portion 64 is fixed at the third shielding portion 683.

In the present embodiment, the fixing portion 64 has a function of supporting the wiring W which is a trunk wiring. The fixing portion 64 includes the wiring support portion 670 and a retainer engagement portion 690. The wiring support portion 670 and the retainer engagement portion 690 are seamlessly integrally formed with the same material. Specifically, the wiring support portion 670 and the retainer engagement portion 690 are formed with a synthetic resin, for example, a rigid synthetic resin such as polybutylene telephthalate.

The wiring support portion 670 includes the fixture insertion hole 671 which is a through-hole which passes through along the mounting direction. The wiring support portion 670 extends from the retainer engagement portion 690 in the sensor longitudinal direction in which the sensor shielding portion 680 extends from the protection portion 63, that is, a leftward direction in the drawing.

The retainer engagement portion 690 includes a retainer engagement hole 691 which is a through-hole which passes through along the mounting direction. The retainer engagement hole 691 is provided so as to engage with the engagement piece 303 by the engagement piece 303 being inserted into the retainer engagement hole 691.

When the on-vehicle device 1 according to the present embodiment is mounted on the vehicle body component B, that is, a front bumper cover of the own vehicle, first, the accessory component 3 is mounted on the vehicle body component B. Specifically, the vehicle body facing portion 302 of the accessory component 3 is pasted to the inner surface (that is, rear surface) of the vehicle body component B with an adhesive such as a double-stick tape.

Then, the cylindrical portion 21 of the on-vehicle sensor 2 is inserted into the retainer body 301 from inside of the vehicle body component B. When the on-vehicle sensor 2 is pushed toward the vehicle body component B until a tip portion of the cylindrical portion 21 is inserted into the mounting hole H, the on-vehicle sensor 2 engages with the accessory component 3. By this means, the on-vehicle sensor 2 is fixed at the vehicle body component B via the accessory component 3.

Subsequently, the sensor-side connector 25 provided at the on-vehicle sensor 2 is coupled to the wiring-side connector 4 on which the inner cover 5 is mounted. In other words, the on-vehicle sensor 2 is electrically connected to the wiring W as a result of the connector coupling portion CC being formed. By this means, a sensor assembly is formed in a state where the sensor assembly is fixed at the vehicle body component B.

Finally, the protective cover 6 is fixed at the accessory component 3. Specifically, the protective cover 6 is covered on the sensor assembly in a predetermined aspect. In this predetermined aspect, the protection portion 63 covers the connector coupling portion CC and the inner cover 5 from behind, that is, from inside of the vehicle body component B. Further, in this predetermined aspect, the sensor shielding portion 680 covers the box portion 23 of the chassis 20 of the on-vehicle sensor 2 from behind. In this event, the engagement piece 303 is inserted into the retainer engagement hole 691. As a result of the protective cover 6 being pushed toward the vehicle body component B until the retainer engagement hole 691 engages with the engagement piece 303, the protective cover 6 is fixed at the accessory component 3. By this means, the sensor assembly fixed at the vehicle body component B is covered with the protective cover 6 from behind, above, below, left and right in the drawing.

The accessory component 3 is a component which is accompanied by or attached to the on-vehicle sensor 2. In more detail, the accessory component 3 is a component which constitutes the on-vehicle device 1 with the on-vehicle sensor 2 and is indivisible from the on-vehicle sensor 2 to form the on-vehicle state. Thus, even in a case where the protective cover 6 is fixed at the accessory component 3 as in the present embodiment, it can be said that the protective cover 6 and the fixing portion 64 are fixed on a "side" of the on-vehicle sensor 2.

At the protective cover 6 in the present embodiment, the fixing portion 64 to be fixed on the on-vehicle sensor 2 side is integrally formed with the protection portion 63 which covers the connector coupling portion CC and the inner cover 5 via the sensor shielding portion 680. Thus, when the fixing portion 64 of the protective cover 6 is fixed on the on-vehicle sensor 2 side, the protection portion 63 of the protective cover 6 covers the connector coupling portion CC and the inner cover 5. Further, the sensor shielding portion 680 covers the box portion 23 of the on-vehicle sensor 2. By this means, it is possible to further improve environment resistance performance such as waterproof performance of the on-vehicle sensor 2 and the on-vehicle device 1 including the on-vehicle sensor 2.

Modifications

The present disclosure is not limited to the above-described embodiments. Thus, changes can be made as appropriate on the above-described embodiments. Typical modified examples will be described below. In the following description of the modified examples, portions different from the above-described embodiments will be mainly described. Further, in the above-described embodiments and the modified examples, the same reference numerals are assigned to portions which are identical with or equivalent to each other. Thus, in the following description of the modified examples, description in the above-described embodiments is employed as appropriate for components having the same reference numerals as those in the above-described embodiments unless technical contradictions occur or unless otherwise additionally described.

The present disclosure is not limited to specific apparatus configurations described in the above-described embodiments. For example, the on-vehicle sensor 2 is not limited to an ultrasonic sensor. In other words, the on-vehicle sensor 2 may be any sensor which can be mounted on the vehicle body component B such as a bumper cover and a body panel.

A shape, a structure, a material, or the like, of the accessory component 3 is not particularly limited. In other words, for example, in the above-described first embodiment, or the like, the accessory component 3 can be typically formed by combining a first accessory component in which the bezel body 31 and the flange portion 32 are seamlessly integrally formed, with a second accessory component including the engagement projection portion 33. In this case, the second accessory component including the engagement projection portion 33 having spring property can be formed with a material different from a material of the first accessory component. Specifically, for example, the first accessory component including the bezel body 31 and the flange portion 32 can be formed with polybutylene telephthalate, or the like. In contrast, the second accessory component including the engagement projection portion 33 can be formed with polyacetal. However, the present disclosure is not limited to such a configuration. Further, as described above, in a case where the on-vehicle sensor 2 is an ultrasonic sensor, the present disclosure can be favorably applied to either a bezel type or a bezel-less type. Still further, the present disclosure can be also favorably applied to a type in which a bezel and a retainer are combined. In this manner, an aspect where the on-vehicle device 1 is mounted and fixed at the vehicle body component B is not particularly limited. Alternatively, the accessory component 3 can be undetachably integrated with the on-vehicle sensor 2. Specifically, a function of the accessory component 3 for being mounted and fixed at the vehicle body component B can be provided at the on-vehicle sensor 2 itself. By this means, the accessory component 3 can be omitted.

A shape and a structure of the wiring-side connector 4 are also not limited to the specific examples described in the above-described embodiments. In other words, for example, the projection engagement hole 42 and/or the operation portion 43 can be omitted. Specifically, the coupling state can be maintained through engagement between the male contact provided at the sensor-side connector 25 and the female contact provided at the connector body 41.

A shape and a structure of the inner cover 5 are also not limited to the specific examples described in the above-described embodiments. In other words, for example, the connector storage portion 51 may be separate from the wiring protection portion 52. Alternatively, the wiring protection portion 52 can be omitted.

The operation opening portion 54 is not essential. In other words, for example, there can be a case where the inner cover 5 is formed with a soft material such as silicone rubber. In this case, the operation portion 43 can be depressed even if an opening portion which exposes the operation portion 43 at the wiring-side connector 4 is not formed at the inner cover 5.

In the above-described embodiments, the inner cover 5 is divided into two portions of the first inner cover 55 and the second inner cover 56 in the sensor width direction. However, the present disclosure is not limited to such an aspect. Specifically, for example, the inner cover 5 may be divided into two portions in a direction different from the sensor width direction.

The inner cover 5 may be coupled to the wiring-side connector 4 so as to be unable to be removed or difficult to be removed. Specifically, for example, the inner cover 5 may be formed so as to cover the circumference of the wiring-side connector 4 through insert molding, or the like. Alternatively, a double structure of the wiring-side connector 4 and the inner cover 5 can be omitted by providing a function of a chipping protective cover to the wiring-side connector 4. In other words, the inner cover 5 can be omitted.

A shape and a structure of the protective cover 6 are also not limited to the specific examples described in the above-described embodiments. In other words, for example, only the outer surface 62 may be a water-repellent surface. Alternatively, only two surfaces of the first inclined surface 63E1 constituting the outer surface 62 and the second inclined surface 63E2 constituting the inner surface 61 may be water-repellent surfaces. In other words, the water-repellent surface does not have to be provided on a vertical plane and an overhang surface in the on-vehicle state. Note that the side wall portion 63E of the protective cover 6 has a smooth surface with no large concavity and convexity such as a groove and inclines as described above in the on-vehicle state. Thus, the shape of the protective cover 6 creates a state where water is less likely to be accumulated at the side wall portion 63E. Thus, the water-repellent surface is arbitrarily provided at the protective cover 6. In other words, the water-repellent surface does not have to be provided at the protective cover 6.

In the above-described embodiments, a dimension in the sensor width direction of the protection portion 63 discontinuously changes at the intermediate portion 63C. However, the present disclosure is not limited to such an aspect. Specifically, for example, the dimension in the sensor width direction of the protection portion 63 may change at a substantially constant rate or continuously. In this case, the intermediate portion 63C is omitted.

In the above-described embodiments, the reinforcement portion 65 is solely provided at the fixing portion 64. However, the present disclosure is not limited to such an aspect. In other words, where the reinforcement portion 65 is provided is not particularly limited if the reinforcement portion 65 is provided to prevent deformation of the fixing portion 64 or deformation of the connection portion between the protection portion 63 and the fixing portion 64. In other words, for example, the reinforcement portion 65 may be solely provided at the connection portion between the protection portion 63 and the fixing portion 64. Further, for example, the reinforcement portion 65 may be provided at the protection portion 63. In other words, the reinforcement portion 65 only requires to be provided at at least one of the protection portion 63, the fixing portion 64, or the connection portion between the protection portion 63 and the fixing portion 64.

A longitudinal direction of the rib in a case where the reinforcement portion 65 is formed by the rib is not particularly limited. In other words, for example, the lateral rib 65A and the vertical rib 65B in FIG. 10 and FIG. 11 may be provided along a direction inclined with respect to the sensor width direction. Specifically, an angle formed by the longitudinal direction of the lateral rib 65A and the vertical rib 65B and the sensor width direction may be from 30° to 60°, typically, 45°.

In the above-described embodiments, the first inclined surface 63E1 and the second inclined surface 63E2 are formed in a substantially planar shape. However, the present disclosure is not limited to such an aspect. In other words, the first inclined surface 63E1 and/or the second inclined surface 63E2 may be formed in a curved shape. Alternatively, the first inclined surface 63E1 and/or the second inclined surface 63E2 may be formed by combining a planar portion and a curved portion. Note that it goes without saying that a normal line in the curved portion is defined by a normal line of a virtual plane which contacts the curved portion concerning a condition that "an angle formed by a normal line and the sensor width direction is equal to or greater than 10°".

In the above-described embodiments, the first inclined surface 63E1 and the second inclined surface 63E2 are provided at the side wall portion 63E. However, the present disclosure is not limited to such an aspect. In other words, the first inclined surface 63E1 and the second inclined surface 63E2 may be provided at the rear wall portion 63D in place of in addition to the side wall portion 63E. Specifically, the first inclined surface 63E1 and the second inclined surface 63E2 can be provided over the rear wall portion 63D and the side wall portion 63E.

Procedure when the on-vehicle device 1 is mounted on the vehicle body component B of the own vehicle is not particularly limited. In other words, for example, in the seventh embodiment, the on-vehicle sensor 2 and the accessory component 3 may be mounted on the vehicle body component B after the accessory component 3 is mounted on the on-vehicle sensor 2.

Terms such as "coupling", "connection" and "linking" can be replaced with each other as appropriate in a range where technical contradictions do not occur. In other words, for example, "coupling" between connectors can be also referred to as "connection" or "linking". Further, an integral "connection" between a right end portion of the box portion 23 and the sensor-side connector 25 can be also referred to as "coupling" or "fixing".

In the above description, a plurality of components which are seamlessly integrally formed may be formed by pasting different members to each other or assembling different members. In a similar manner, a plurality of components which are formed by pasting different members to each other or assembling different members may be seamlessly integrally formed.

In the above description, a plurality of components which are formed with the same material may be formed with materials different from each other. In a similar manner, a plurality of components which are formed with materials different from each other may be formed with the same material.

It goes without saying that components constituting the above-described embodiments are not necessarily essential except a case where it is explicitly described that the components are essential or a case where it can be considered that the components are obviously essential in principle. Further, in a case where numerical values such as the numbers, numerical values, quantities and ranges of the components are described, numerical values in the present disclosure are not limited to specific numerical values except a case where it is explicitly described that the numerical values are essential, or a case where the numerical values are obviously limited to the specific numerical values in principle.

In a similar manner, in a case where shapes, directions, positional relationship, or the like, of components are described, shapes, directions, positional relationship, or the like, of the present disclosure are not limited to the shapes, the directions, the positional relationships, or the like, except a case where it is explicitly described that the shapes, the directions, the positional relationship, or the like, are essential or a case where the shapes, the directions, the positional relationship, or the like, are obviously limited to specific shapes, directions, positional relationship, or the like, in principle. Materials which constitute respective portions are not particularly limited except a case where it is explicitly described that the materials are essential or a case where the materials are obviously limited to specific materials in principle.

The modified examples are also not limited to the above-described examples. For example, a plurality of embodiments can be combined unless technical contradictions occur. Specifically, for example, the wiring support portion 670 according to the fourth embodiment illustrated in FIG. 17 to FIG. 19 can be provided at the protective cover 6 according to the first to the third embodiments. Further, the wiring support portion 670 according to the fourth embodiment illustrated in FIG. 17 to FIG. 19 and the wiring support portion 670 according to the fifth embodiment illustrated in FIG. 20 to FIG. 24 can coexist. Further, the wiring facing portion 66 according to the second embodiment or the third embodiment or the cover locking portion 590 according to the fourth embodiment can be provided at the protective cover 6 according to the seventh embodiment.

In a similar manner, a plurality of modified examples can be combined unless technical contradictions occur. Further, at least one of the plurality of embodiments and at least one of the plurality of modified examples can be combined unless technical contradictions occur.

CONCLUSION

The present disclosure has been made in view of the circumstances, or the like, described above as examples. The present disclosure is to further improve environmental resistance such as waterproof resistance at an on-vehicle sensor and an on-vehicle device including the on-vehicle sensor.

According to one aspect of the present disclosure, a protective cover protects a connector coupling portion which is an electrical connection between an on-vehicle sensor to be mounted on a vehicle body component and a wiring.

The protective cover includes
a protection portion which covers the connector coupling portion at which a sensor-side connector which is provided on the on-vehicle sensor side and which extends in an extending direction is coupled to a wiring-side connector which is provided on the wiring side and which is to be coupled to the sensor-side connector while moving relatively with respect to the sensor-side connector in a coupling direction opposite to the extending direction, and
a fixing portion integrally provided with the protection portion so as to be fixed on the on-vehicle sensor side.

According to another aspect of the present disclosure, an on-vehicle device includes an on-vehicle sensor to be mounted on a vehicle body component, and a protective cover which protects a connector coupling portion which is an electrical connection between the on-vehicle sensor and a wiring.

In the on-vehicle device,
the on-vehicle sensor includes a sensor-side connector extending in an extending direction,
the protective cover includes
a protection portion which covers the connector coupling portion at which the sensor-side connector is coupled to a wiring-side connector which is provided on the wiring side and which is to be coupled to the sensor-side connector while moving relatively with respect to the sensor-side connector in a coupling direction opposite to the extending direction, and
a fixing portion which is integrally provided with the protection portion so as to be fixed on the on-vehicle sensor side.

At the protective cover having the above-described configuration, the fixing portion fixed on the on-vehicle sensor side is integrally provided with the protection portion which covers the connector coupling portion. Thus, if the fixing portion at the protective cover is fixed on the on-vehicle sensor side, the protection portion at the protective cover covers the connector coupling portion. By this means, it is possible to further improve environment resistance performance such as waterproof performance of the on-vehicle sensor and the on-vehicle device including the on-vehicle sensor, particularly, at the connector coupling portion.

What is claimed is:

1. A protective cover for protecting a connector coupling portion that provides an electrical connection between an ultrasonic sensor and wiring, the ultrasonic sensor being an on-vehicle sensor that is mounted on a bumper cover of a vehicle as a vehicle body component, the protective cover comprising:
a protection portion configured to cover the connector coupling portion at which a sensor-side connector is coupled to a wiring-side connector, the sensor-side connector being provided on an ultrasonic sensor side of the connector coupling portion and configured to extend in an extending direction, the wiring-side connector being provided on a wiring side of the connector coupling portion and configured to be coupled to the sensor-side connector, the wiring-side connector being movable relatively with respect to the sensor-side connector in a coupling direction that is opposite to the extending direction; and
a fixing portion configured to be integrally provided with the protection portion so as to be fixed on the ultrasonic sensor side,
wherein the protection portion is configured to provide a waterproof cover for an inner cover in a state where the protective cover is fixed on the ultrasonic sensor side, the inner cover configured to provide a chipping protective cover that protects the connector coupling portion from a flying pebble, by covering the connector coupling portion.

2. The protective cover according to claim 1, wherein the inner cover is mounted on the wiring-side connector, the inner cover comprises an operation opening portion that exposes part of the wiring-side connector to outside in a state where the inner cover is mounted on the wiring-side connector, and
the protection portion is configured to cover the operation opening portion.

3. The protective cover according to claim 1, wherein the inner cover comprises a storage opening portion that is open and configured to store the wiring-side connector, and
the protection portion comprises a proximal wall portion that is a plate-like portion having a sheet thickness direction along the extending direction, the proximal wall portion provided ahead of the storage opening portion in the coupling direction in a state where the wiring-side connector is coupled to the sensor-side connector so as to cover a coupling direction side of the storage opening portion.

4. The protective cover according to claim 1, wherein the protection portion comprises:
a rear wall portion that is a plate-like portion having a sheet thickness direction along a mounting direction in which the ultrasonic sensor is mounted on the bumper cover, and that covers the connector coupling portion by adjoining the connector coupling portion along the mounting direction; and
a side wall portion that is a plate-like portion having a sheet thickness direction along a sensor width direction which is orthogonal to both the mounting direction and the extending direction, and that covers the connector coupling portion by adjoining the connector coupling portion along the sensor width direction.

5. The protective cover according to claim 4, wherein at least one of the rear wall portion and the side wall portion comprises an inclined surface that is inclined with respect to the sensor width direction, and the inclined surface is provided so that a normal line of a direction separate from the bumper cover faces a direction separate from the vehicle body component.

6. The protective cover according to claim 5, wherein the inclined surface is provided so that an angle formed by the normal line and the sensor width direction is equal to or greater than 10 degrees.

7. The protective cover according to claim 1, wherein the protection portion comprises a water-repellent surface.

8. The protective cover according to claim 1, further comprising:
a wiring facing portion that extends from the protection portion so as to face the wiring extending from the wiring-side connector,
wherein
the wiring facing portion is provided so as to be fixed at the wiring.

9. The protective cover according to claim 8, wherein the protection portion is provided so as to be slidable with respect to the connector coupling portion around a portion where the wiring facing portion is fixed at the wiring.

10. The protective cover according to claim 1, further comprising:
a reinforcement portion that prevents deformation of the fixing portion or a connection portion between the fixing portion and the protection portion.

11. The protective cover according to claim 10, wherein the reinforcement portion is formed by a rib.

12. The protective cover according to claim 1, further comprising:
a wiring support portion that supports the wiring.

13. An on-vehicle device comprising:
an ultrasonic sensor as an on-vehicle sensor mounted on a bumper cover as a vehicle body component, the ultrasonic sensor having a sensor-side connector extending in an extending direction;
an inner cover serving as a chipping protective cover and configured to protect a connector coupling portion from a flying pebble, the connector coupling portion comprising an electrical connection between the ultrasonic sensor and a wiring; and
a protective cover configured to provide waterproof protection of the connector coupling portion,
the protective cover comprising:
a protection portion configured to cover the connector coupling portion at which the sensor-side connector is coupled to a wiring-side connector, the wiring-side connector being provided on a wiring side of the connector coupling portion and configured to be coupled to the sensor-side connector, the wiring-side connector being movable relatively with respect to the sensor-side connector in a coupling direction that is opposite to the extending direction; and
a fixing portion configured to be integrally provided with the protection portion so as to be fixed on an on-vehicle sensor side of the on-vehicle device, wherein
the protection portion is configured to provide a waterproof cover for the inner cover in a state where the protective cover is fixed on the on vehicle sensor side.

* * * * *